United States Patent [19]
Thompson et al.

[11] 3,810,138
[45] May 7, 1974

[54] INTERPOLATIVE SENSOR OUTPUT VISUAL MAP DISPLAY SYSTEM

[75] Inventors: Francis T. Thompson, Murrysville; Steven L. Silverstein; Shan C. Sun, both of Pittsburgh, all of Pa.

[73] Assignee: Westinghouse Electric Corporation, Pittsburgh, Pa.

[22] Filed: Jan. 10, 1972

[21] Appl. No.: 216,691

[52] U.S. Cl. ............. 340/225, 176/19 R, 323/94, 340/324 R, 340/378
[51] Int. Cl. ............................................. G08b 5/00
[58] Field of Search........ 340/166 R, 225, 172, 378, 340/324 R, 324 M; 178/18; 176/19 EC; 323/94, 68–70

[56] References Cited
UNITED STATES PATENTS

| | | | |
|---|---|---|---|
| 3,157,822 | 11/1964 | Haskell | 323/94 R |
| 3,387,084 | 6/1968 | Hine et al. | 340/225 |
| 3,548,403 | 12/1970 | Johnson | 340/324 S |
| 3,167,665 | 1/1965 | Godby et al. | 323/94 R |
| 3,652,921 | 3/1972 | Nye | 323/94 R |
| 3,153,739 | 10/1964 | Graffenreid | 340/378 R |

Primary Examiner—Donald J. Yusko
Assistant Examiner—Marshall M. Curtis
Attorney, Agent, or Firm—D. C. Abeles

[57] ABSTRACT

A sensor output visual display system is presented for coherently displaying the output readings of a plurality of sensors, such as the in-core thermocouples of a nuclear reactor. The in-core temperature distribution, as detected by the in-core thermocouples, is displayed using light intensity modulation over a reactor core map — the brighter areas on the map corresponding to the hotter areas of the core. The active display area is divided into blocks, each corresponding to a zone within the core representing a fuel rod assembly. Interpolation for assemblies not monitored directly by thermocouples is provided for a coherent display. The interpolation is performed by a resistive plate or resistor matrix constructed to conform to the geometric configuration of the reactor core. The total temperature information is then processed to interface with the display media. A visual alarm feature is included to indicate thermocouple readings which are outside preset limits and for identifying the existence of defective thermocouples.

21 Claims, 20 Drawing Figures

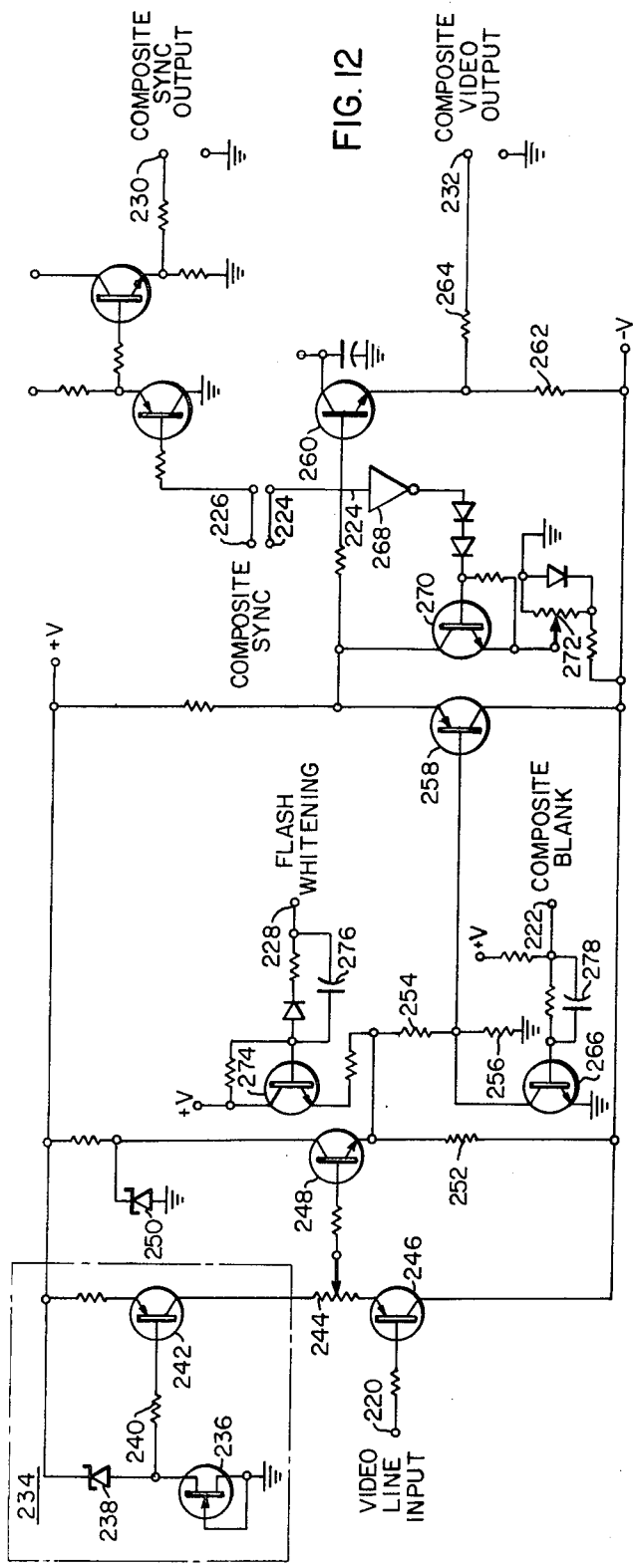
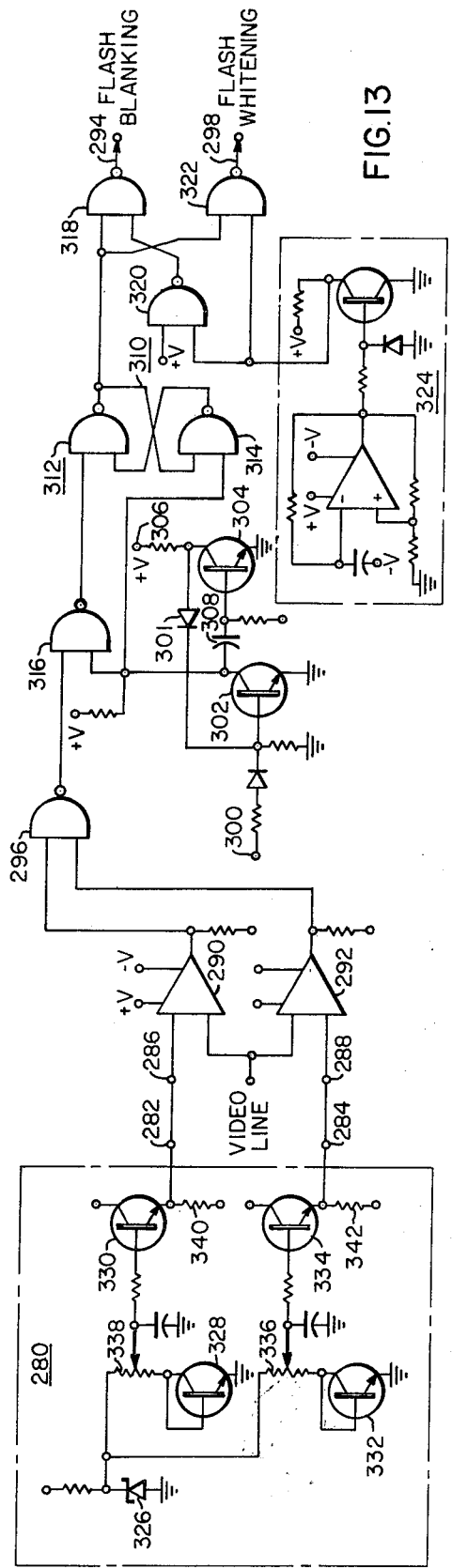
FIG. 12
FIG. 13

3,810,138

INTERPOLATIVE SENSOR OUTPUT VISUAL MAP DISPLAY SYSTEM

BACKGROUND OF THE INVENTION

This invention pertains in general to a monitoring sensor visual display system and more particularly to such a system that visually and coherently displays the temperature distribution within the core of a nuclear reactor.

The release of large amounts of energy through nuclear fission reactions is now quite well known. In general, a fissionable atom such as $U^{233}$, $U^{235}$, or $PU^{239}$ absorbs a neutron in its nucleus and undergoes a nuclear disintegration. This produces on the average, two fission products of low atomic weight and great kinetic energy, and several fission neutrons also of high energy.

The kinetic energy of the fission products is quickly dissipated as heat in the nuclear fuel. If, after this heat generation, there is at least one neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material or nuclear fuel is contained in fuel elements which may have various shapes, such as plates, tubes or rods. These fuel elements are usually provided on their external surfaces with a corrosion resistant, non-reactive cladding which contains no fissionable or fertile material. The fuel elements are grouped together at fixed distances from each other in a coolant flow channel or region as a fuel assembly, and a sufficient number of fuel assemblies are arranged in a spaced array to form the nuclear reactor core capable of the self-sustained fission reaction referred to above. The core is usually enclosed within a reactor vessel.

Power distribution within the core is a primary parameter in nuclear reactor operation. A maldistribution may be detected by analysis of data from in-core and out-of-core instrumentation. One technique involves the monitoring of the reactor temperature distribution obtained from fixed in-core thermocouples. In present practice, there are thermocouples in approximately one out of four fuel rod assemblies (reactor cores generally varying from 121 to 193 assemblies), whose outputs are sampled at approximately eight second intervals by a supervisory computer. According to present practice, temperatures corresponding to the thermocouples are printed out whenever an alert condition is detected by the computer software. However, the information in this form is delayed and does not lend itself to easy interpretation by the plant operator. Generally, a more effective information transfer is needed, such as a real time pictorial presentation.

SUMMARY OF THE INVENTION

In order to overcome the deficiencies of the prior art, this invention provides, in general, a monitoring sensor display system for displaying the parameters monitored by a plurality of sensors over a defined area divided into a plurality of zones. The plurality of sensors are positioned to monitor at least a portion of the zones within the defined area. Each of the sensors provide an output representative of the corresponding parameter monitored. Additionally, means are provided for interpolating the outputs of the sensors to provide a display output representative of the interpolated value of the monitored parameter in each of the corresponding zones. The respective interpolated values are then visually displayed according to each of the corresponding zones.

More specifically, as illustrated in the exemplary embodiments set forth hereinafter, a visual temperature display system is described for application in a nuclear reactor environment. The reactor in-core temperature distribution is displayed by using light intensity modulation over a core map display — the brighter areas on the map corresponding to the hotter areas of the core. The active display area is divided into blocks, each representing a fuel rod assembly. Interpolation for assemblies not monitored directly by in-core thermocouples is provided for a coherent display. This is performed by a resistive plate or by a resistor matrix. The total temperature information is then processed to interface with the visual display media. Additionally, visual alarm provisions are described for indicating sensor readings which are outside preset limits and for identifying the existence of a defective thermocouple.

Two alternate display media are described: the first provides an electroluminescent display utilizing electroluminescent lamps; and the second provides a cathode ray tube display utilizing a conventional closed circuit TV monitor with a novel interface including a new and efficient scan generator and scan select system.

BRIEF DESCRIPTION OF THE DRAWINGS

For a better understanding of the invention, reference may be had to the preferred embodiment, exemplary of the invention, shown in the accompanying drawings, in which:

FIG. 12 is a schematic circuitry diagram of the video processor employed in the exemplary embodiment illustrated in FIG. 7;

FIG. 13 is a schematic circuitry diagram of an exemplary flash signal generator employed in conjunction with the circuits of FIGS. 9 and 12;

DESCRIPTION OF THE PREFERRED EMBODIMENT

Power distribution within the core of a nuclear reactor is a primary parameter in monitoring reactor operation. A mal-distribution of power within the core of the reactor may be detected by analysis of the data received from in-core and out-of-core instrumentation. One technique presently employed to survey the reactor's power distribution involves monitoring the reactor temperature distribution obtained from fixed in-core thermocouples positioned throughout the fuel rod assemblies. Presently, there are thermocouples in approximately one out of four fuel rod assemblies (reactor cores vary from 121 to 193 assemblies) whose outputs are sampled at 8 second intervals by a supervisory computer.

Figure 1:
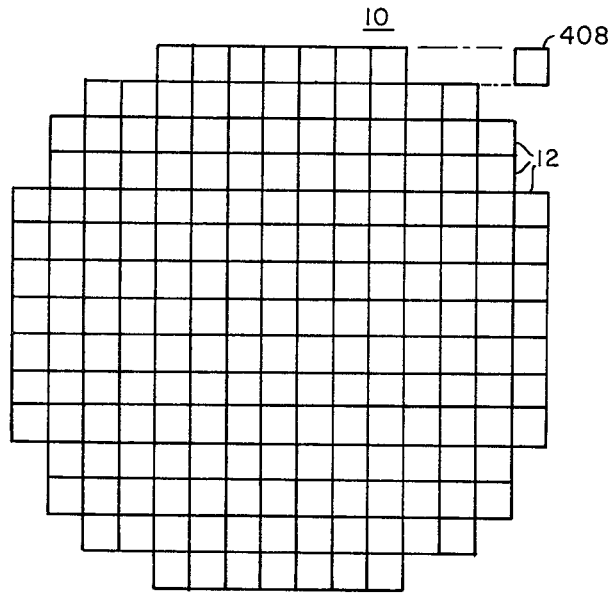
FIG. 1 is a planned view of a nuclear fuel core.
Figure 2:
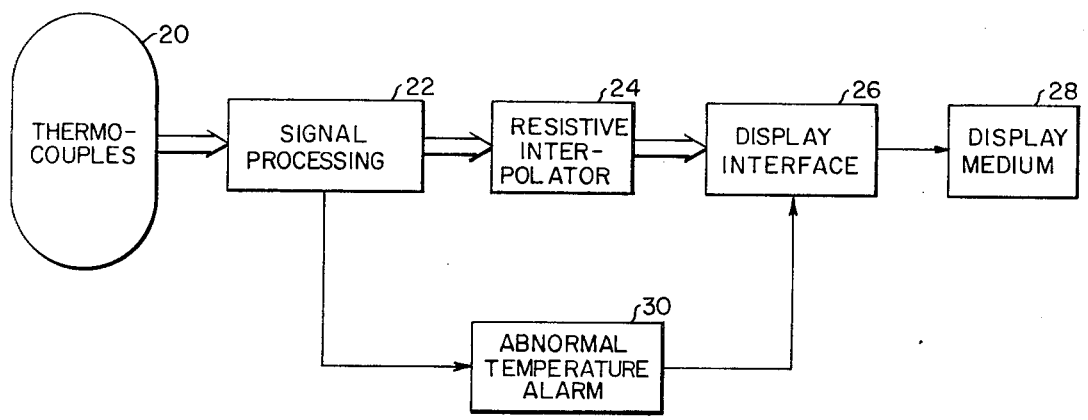
FIG. 2 is a system block diagram exemplary of the operation of this invention.
Figure 4:
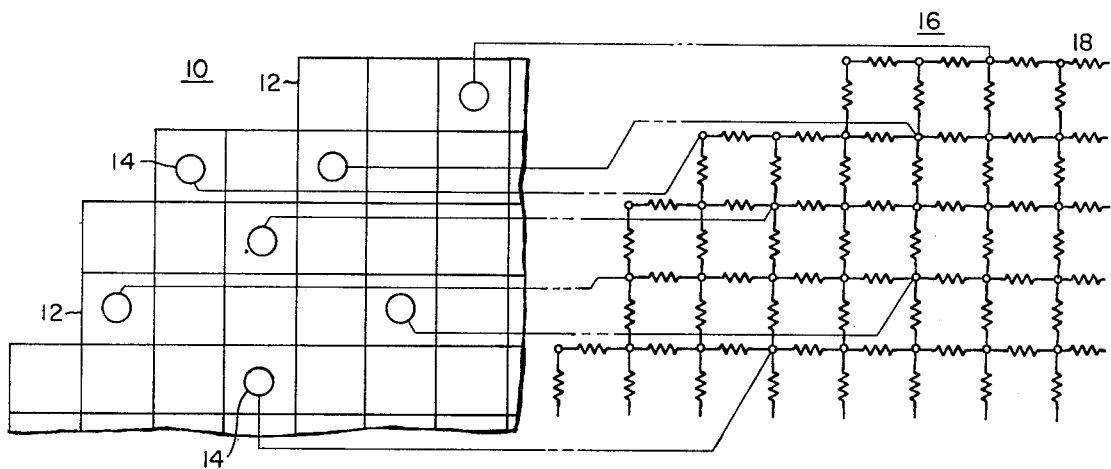
FIG. 4 is a partial schematic view of the resistive interpolator of this invention illustrating its interconnection with the core of FIG. 1.

A planned view of a reactor core 10 illustrating the relative position of the fuel rod assemblies 12 is shown in FIG. 1. An exemplary arrangement of the relative position of the thermocouples 14, within the fuel assembly locations 12, is illustrated in FIG. 4. Temperatures corresponding to the thermocouples 14 are presently printed out by the supervisory plant computer whenever an alert condition is detected by the computer software. However, the information in this form does not lend itself to easy interpretation by the plant operator. For more effective information transfer this invention provides a coherent pictorial presentation of the thermocouple information. The visual display employed utilizes light intensity modulation over a core map, similar to the reactor core map illustrated in FIG. 1. The brighter areas illuminated on the core map display correspond to the hotter areas of the reactor core. The active display area is divided into blocks corresponding to the relative location of the fuel assemblies 12 within the core 10. Interpolation for assemblies not covered by thermocouples is provided by a resistor matrix to establish a coherent display. Processed signals from the thermocouples are fed into the matrix in the same geometric fashion as the thermocouples are positioned in the reactor core. Thus, each node 18 of the exemplary matrix 16 illustrated in FIG. 4 corresponds to an assembly 12 within the reactive core 10. The total information is then processed as illustrated in FIG. 2 to interface with the display media. Additionally, visual alarm provisions are included to indicate when a particular thermocouple sensor reads outside preset limits, and when a defective sensor is detected by the supervisory computer.

Thus, the basic systems operation of this invention may be generally understood by reference to the block diagram illustrated in FIG. 2. Each of the individual blocks illustrated in FIG. 2 are set out in more detail in the figures following thereafter. Block 20 represents the thermocouples which have previously been described with reference to FIG. 4. The signals derived from the thermocouples, representative of the relative temperatures encountered within the corresponding core locations, are fed to a signal processing unit, represented by block 22, which processes the signals into compatible form to interface with the resistive interpolator 24 and the abnormal temperature alarm 30. The respective signals, representative of the temperatures indicated by the corresponding thermocouples, are then fed to a display interface 26 which processes the signals to a form compatible with the display medium 28. In the following description two exemplary display media are provided, each one being capable of supplying the pictorial display contemplated by this invention.

Figure 3:
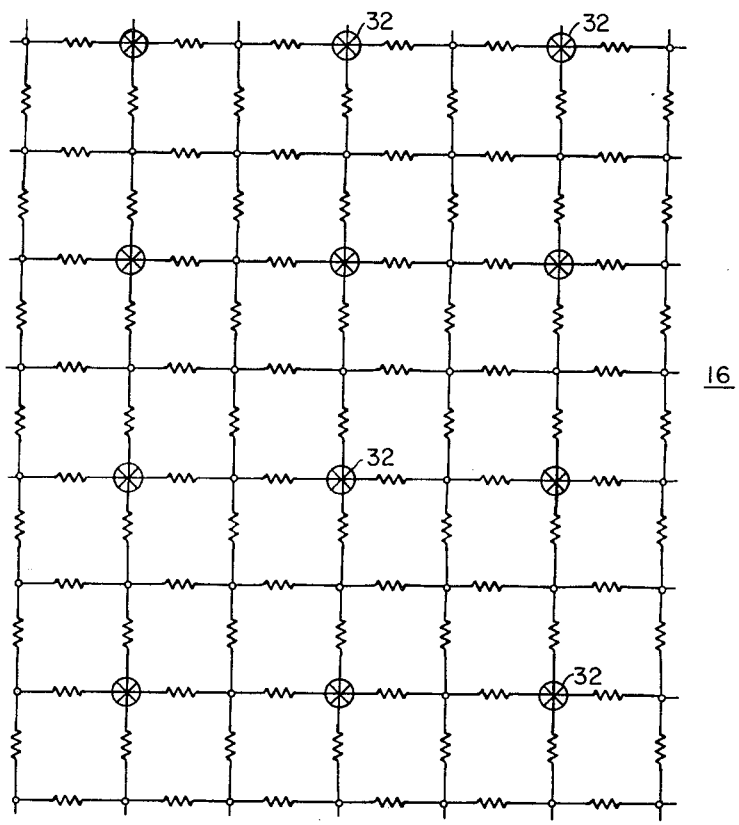
FIG. 3 is a partial schematic circuitry diagram of a resistor matrix with uniformly distributed inputs.

In present day reactors, there are approximately one-fourth the number of thermocouples as fuel rod assemblies. In order to have a coherent display, temperature signals must be derived for the other three quarters of the fuel assemblies. The resistive interpolator illustrated in FIGS. 2, 3 and 4 is provided for this purpose. FIGS. 3 and 4 illustrate a resistor matrix 16 which will accomplish the desired interpolation. Where finer resolution is desired, the resistor matrix 16 may be replaced by a resistive plate with analogous terminal connections. The resistor matrix 16, illustrated in FIG. 4, is designed to geometrically conform to the reactor core map illustrated in FIG. 1 and in its fully illustrated form would contain 225 nodes 18. Appropriate sections around the perimeter may be removed so that the matrix will conform to the geometric configuration of any particular reactor. Since each node 18 is considered a voltage source, the impedance at each output is important. This impedance can be determined by standard circuit analysis techniques well known in the art. The output impedance at the respective nodes 18 that are also inputs from the corresponding sensors equals the output impedance of the source of that input. In the partial resistor matrix illustrated in FIG. 3, the inputs from the corresponding sensors are symmetrically arranged and designated by circled X's referenced by reference character 32. It is to be understood, however, that alternate embodiments may be employed providing for a non-symmetrical arrangement of the input nodes corresponding to the thermocouple locations in the assembly. However, in such an embodiment, where the inputs are positioned at adjacent nodes, it is desirable to have the resistor normally located between those nodes omitted, since interpolation would not be necessary and the net current demand from the input sources would be reduced. Thus, the resistive matrix provides outputs at the thermocouple inputs corresponding to the relative temperature distribution within the core, each additional matrix node providing an interpolated temperature profile of the corresponding location in the core so as to present a coherent temperature display over the core map.

Figure 5:
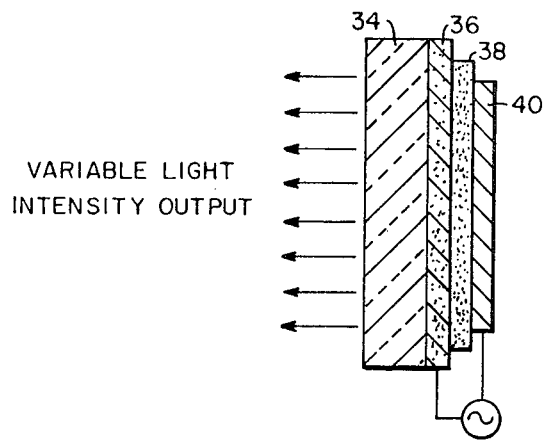
FIG. 5 is a cross-sectional view of an electroluminescent lamp employed as the visual display in one embodiment of this invention.

The matrix outputs are then supplied to a visual display for convenient comparison by the plant operator. Two exemplary embodiments of visual displays will be described: the first utilizes an electroluminescent lamp; and the second utilizes the attributes of a cathode ray tube. The first exemplary embodiment set forth for the visual display is illustrated in block form in FIG. 6. The details of construction of an exemplary electroluminescent lamp are illustrated in detail in FIG. 5.

An electroluminescent lamp utilizes an electroluminescent material, phosphor, which emits light when placed in a strong alternating electric field. The powdered phosphor 38 is mixed with a high dielectric binder and deposited on a glass substrate 34 having a thin transparent conductive film of tin oxide 36 which acts as the front electrode of the lamp. The back electrode 40 is a non-transparent deposited aluminum film. The phosphor is sensitive to moisture which causes the electrical-to-light conversion efficiency to deteriorate rapidly with use. So the lamp is baked in its final construction stage, then sealed with a rear cover plate, not shown. The phosphor 38, sandwiched between the two conducting electrodes 36 and 40, form a capacitor. With a high dielectric constant binding material and a thin phosphor layer, a light output in excess of 50 ft-lamberts may be obtained. Supply voltages up to 250 volts and frequencies of 400 to 2,000 Hz are considered reasonable. One advantage of such a lamp is that if the maximum operating voltage is exceeded in operation, the most highly stressed point of the dielectric will break down, providing a relatively low impedance path to dissipate the energy of the voltage spike. Upon return to a normal voltage condition, the mechanism of failure point is such that it invariably goes open circuited, allowing the panel to function normally.

In this exemplary embodiment, a 12 inch by 12 inch sealed electroluminescent lamp is utilized with the active display area divided into 225 (15 × 15) blocks. The active display area is formed by scribing the blocks on the rear aluminum electrode and bringing conductors out to the edge for connection to the individual blocks. In this configuration, the front electrode would still be continuous and common to all elements with the individual brightness being controlled by the voltages applied to the isolated aluminum back electrodes.

Figure 6:
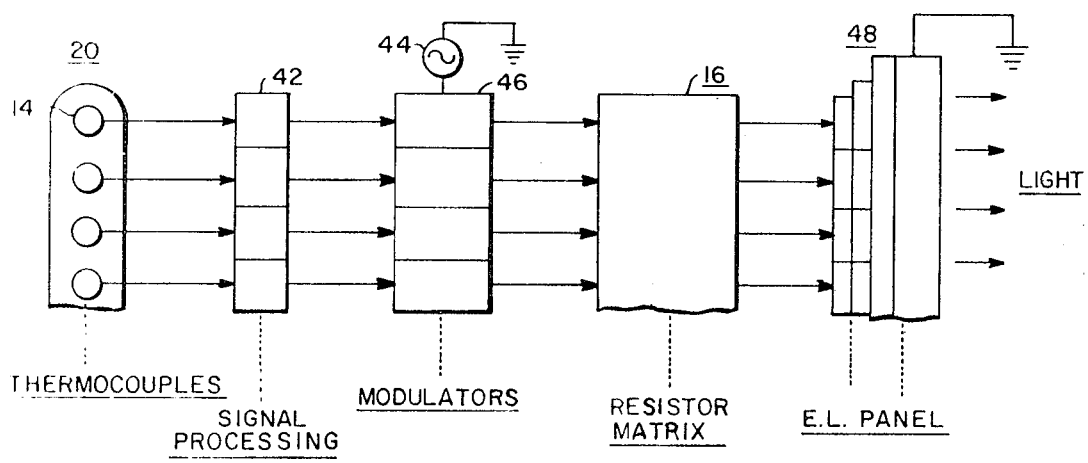
FIG. 6 is a schematic block diagram of the interface employed by this invention in conjunction with the visual display of FIG. 5.

An electroluminescent lamp, constructed in accordance with the aforementioned description, is illustrated schematically by reference character 48 in FIG. 6. The driving circuitry basically comprises a number of AC amplifiers 46, well known in the art, which are driven from an AC source 44, and modulated according to the respective monitoring signals derived from the thermocouples 14 through the signal processor 42.

The signal processor is provided to convert the thermocouple signals into compatible form for readout by the electroluminescent panel. The AC amplifiers 46 present the modulated voltages to the matrix 16 which then drives the electroluminescent blocks in the panel 48. The actual values chosen for the resistors within the matrix depend upon the driving requirements of the read-out. Additionally, the blocks in the panel not utilized are grounded to conform the panel to the geometric shape of the core map. Thus, this invention provides a coherent display of the reactor temperature distribution which the plant operator can assimilate in a relatively short period of time. The coherency of the display is augmented by the novel resistor interpolator which provides interpolated values for displaying relative temperatures in core locations not directly monitored by the in-core thermocouples.

The secondary exemplary embodiment contemplated by this invention utilizes a conventional closed circuit TV monitor in combination with a novel interface that provides the composite video input signal. In accordance with this invention the interfacing circuitry provides four basic functions illustrated in schematic block form in FIG. 7. A resistor matrix 16 is shown for the temperature extrapolation; a scan generator 52 is provided for producing the basic display pattern to be read on the TV monitor 58; a scan interface 50 is provided for relating the resistor matrix potentials to the display pattern; and video circuitry is provided for final signal processing. In addition, a signal conditioning and processing unit 56, to be described hereinafter, is provided to buffer the thermocouples 14 and process the signals to compatible form for the circuitry of this invention.

The pattern generated on the cathode ray tube of the TV monitor is similar to the pattern provided by the electroluminescent panel. Consequently, the active display area is desirably divided into 15 rows and 15 columns to correspond to the fuel assembly core locations. As each line is swept across the cathode ray tube, the scan generator addresses the scan interface by row and column to select the appropriate matrix node voltage to be inputed to the video circuitry. The modulated intensity of the scan is directly proportional to this voltage. Dark lines separating the rows and columns produced on the cathode ray tube face are generated by blanking pulses from the scan generator at appropriate intervals. The additional attributes of the circuitry of this invention will become apparent from the following description.

Figure 7:
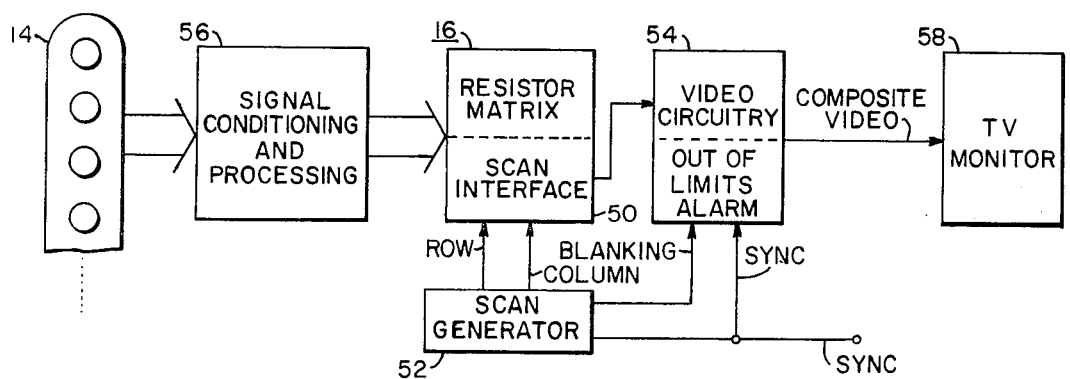
FIG. 7 is a schematic block diagram of a second embodiment of this invention employing a cathode ray tube visual display.
Figure 8:
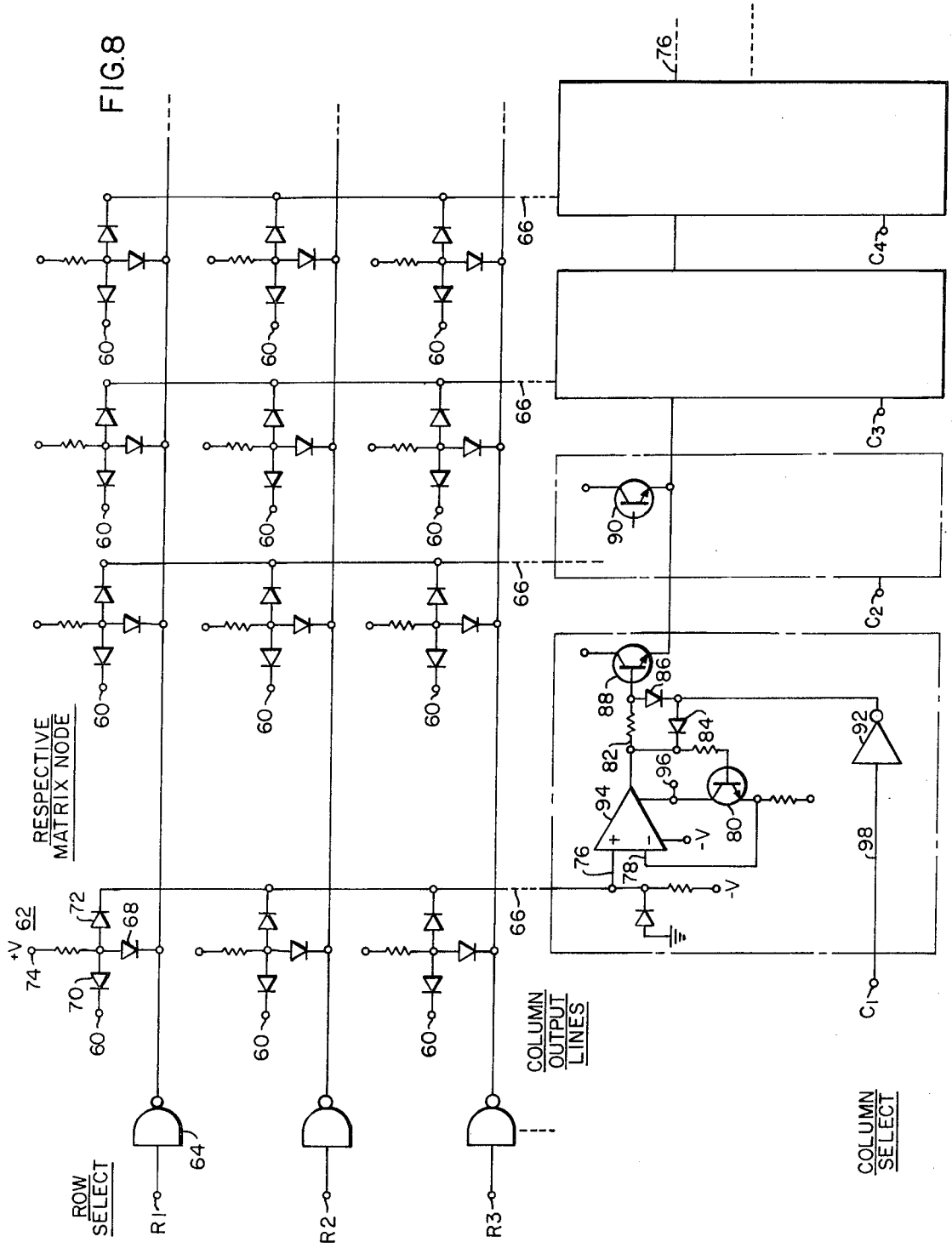
FIG. 8 is a schematic circuitry diagram of a cathode ray interface network employed in conjunction with the visual display of FIG. 7.

A partial schematic of the scan interface 52 shown in FIG. 7 is illustrated in FIG. 8. In this exemplary embodiment there are acutally 225 sets of the three diode-one resistor combinations, 62, each one respectively connecting a corresponding node of the resistor matrix representative of one of the 225 locations in the core. Row selection, corresponding to the row appearing on the face of the cathode ray tube, is accomplished by applying a logical zero to the corresponding row NAND gate 64, and logical ones to all the other row NAND gates. The derivation of the row select signals will be described with reference to the circuitry presented hereinafter. The output of the selected row gate receiving the logical zero input will be high, allowing the matrix voltages (approximately 0 to 3 volts in this embodiment) associated with the 15 positions in the corresponding row to appear on the column output lines 66.

According to the conventions assumed, high and low outputs, referenced in the description of the exemplary embodiments set forth, should be understood to connote the logical one and zero states, respectively, normally associated with logic circuitry. Specifically, when the output of NAND gate 64 is high, diode 68 associated with that output will be back-biased and diode 72, in series with the respective column output line 66, will be tied to the matrix node voltage applied at terminal 60. Accordingly, the matrix node terminal voltage will appear across the output line 66. It should be noted that NAND gate 64 effectively functions as an inverter and may be substituted with any similar component which will perform the inverter function. Similarly, the corresponding matrix node voltages communicated to the remaining columns associated with the row thus enabled will be displayed on the corresponding column output lines 66 in a similar manner. The remaining row NAND gates 64 receiving a logical one input will have a relative zero output tieing each of the corresponding input terminals to diodes 68 and 72 to ground, back-biasing the diodes and effectively disconnecting the respective column output lines 66 from the corresponding matrix inputs. More specifically, with the NAND gate 64 output at a logical zero state, the cathode of diode 68 will be brought near ground. Thus, the common node of the three diodes will be maintained at approximately +0.7V, such that if the cathodes of diodes 70 and/or 72 are at a voltage greater than ground, then diodes 70 and/or 72 will be back biased. As the cathode ray tube is scanned, the column output lines 66 are similarly selected and gated onto the video line 76. The operational amplifier-transistor combination at each column output line is supplied as a low impedance source to the video line 76. Furthermore, the operational amplifier-transistor combination provides higher currents for the high speed operation required for column selection (column selection occurring 15 times per scan line whereas row selection occurs only once every sixteen lines of the cathode ray tube scan).

Referring to the column select circuitry of FIG. 8, the operation thereof can be understood by recognizing that transistors 88 and 80 are matched transistors and the negative feedback provided operational amplifier 94 between its output 82 and its input 78 through transistor 80 will tend to equalize the voltage appearing at pins 78 and 76. The output 82 of operational amplifier 84 drives the base of transistors 80 and 88. A voltage source 96 is provided to supply the voltage required by the operational amplifier 94 and bias the collector of transistor 80. Because transistors 80 and 88 are matched and terminals 78 and 76 of the operational amplifier 94 are approximately at the same voltage, the output of the emitter of transistor 88 will be substantially equal to the column output line voltage. Thus, this circuit provides a low impedance source for the video line. The column select signals are derived from circuitry to be described hereinafter, and are provided at terminal 98 to inverter 92. When the output of inverter 92 transitions low, the base of transistor 88 is essentially tied to ground turning transistor 88 off and disabling the column output from appearing on the video line. When the output of the column select inverter 92 transitions high, diode 86 is back-biased blocking the inverter output current from flowing to the base of transistor 88, enabling the base to be driven by the corresponding column output line and providing an output signal to the video line through the transistor emitter. Diode 84 is provided to compensate for the capacitance associated with diode 86 in order to reduce switching spikes. Thus, column selection is accomplished by providing logical zero signals sequentially to the column select inverters 92 intermediate of the selection signals provided to each of the row gate inverters 64. As previously mentioned, the corresponding matrix nodes are coupled to the respective terminals 60. Accordingly, the interface described presents the respective node voltages, according to the select signals derived from the scan generator, to the video line output for communication to the cathode ray tube. Then, as the cathode ray tube is swept, the column gates are sequentially activated and the row select advanced at the proper intervals.

Figure 9:
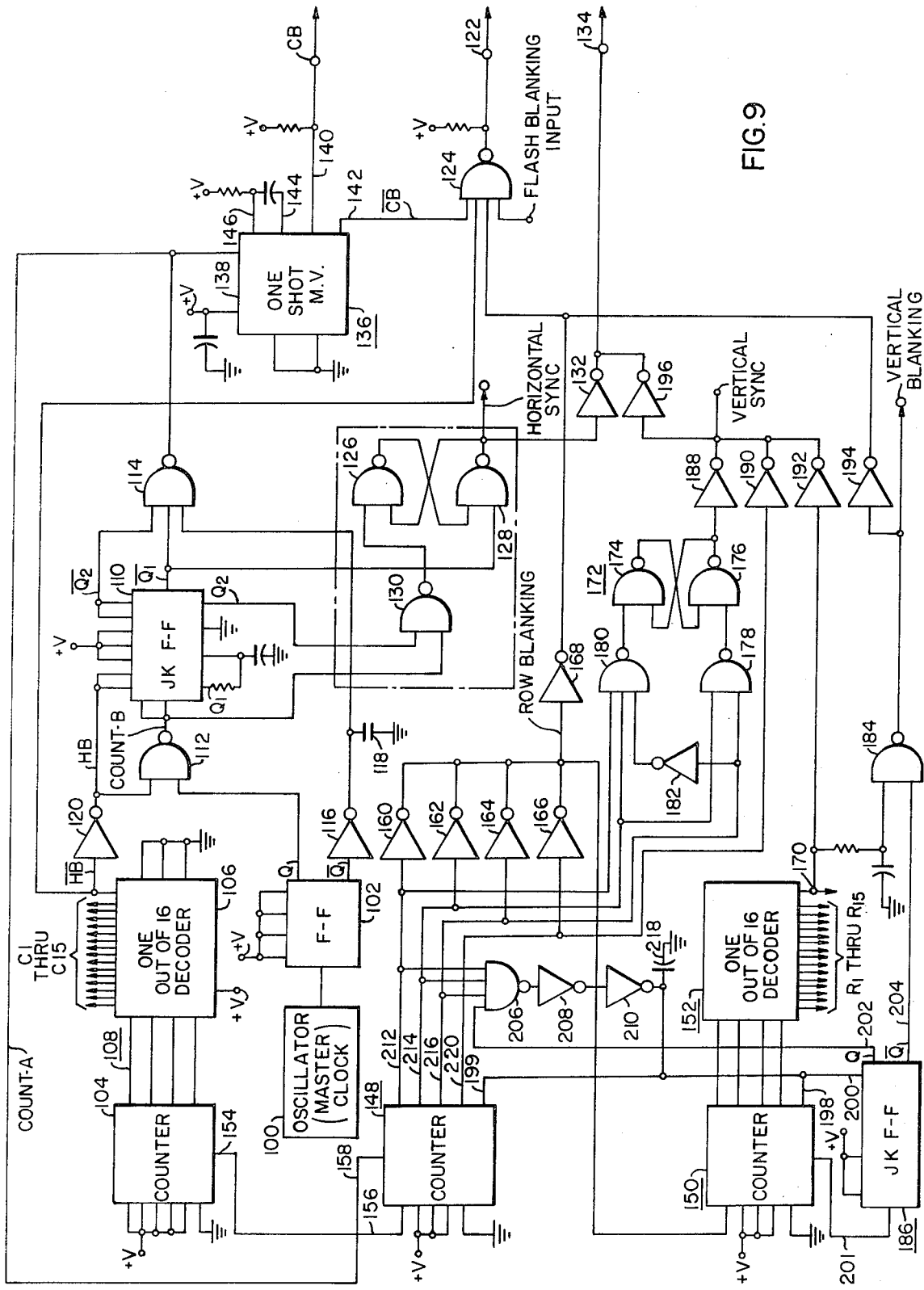
FIG. 9 is a schematic circuitry diagram of a scan generator employed in conjunction with the circuits of FIGS. 7 and 8.

The scan generator, illustrated in schematic circuitry form in FIG. 9, provides all the requisite timing and control signals that constitute the composite video signal. The signals provided include: the row and column select; blanking for row and column formation; horizontal synchronization and blanking; and vertical synchronization and blanking.

A standard closed circuit TV monitor, presented with inputs from the aforedescribed composite video signal will visually display the intensity modulated core map of this invention indicative of the temperature distribution within the reactor core. TV monitors can be categorized in two classes, grouped according to the form of input required. Accordingly, the composite video input can be provided in either of two ways depending upon the type of monitor used. The first type of monitor requires a separate composite synchronization signal containing the horizontal and vertical synchronization pulses and a separate video signal containing the video signal and blanking pulses. The second type of monitor requires a single input embodying the entire composite video signal which includes both the video signal and the composite synchronization signal. The scan generator contemplated by this invention provides outputs compatible with both types of monitors. The horizontal and vertical synchronization pulses supplied are distinguished by their duration — the former having a much shorter duration than the latter. Additionally, the horizontal synchronization pulse is provided once each line, while the vertical synchronization pulse is provided once each field. As is known in the art a field is the total number of lines required to be scanned before the top of the cathode ray tube is again scanned.

The TV monitor considered with this exemplary embodiment requires approximately 63.5 microseconds to scan each line; approximately 53.4 microseconds lapse during the active scan with approximately 10.1 microseconds reserved for blanked flyback. Approximately 263 lines are provided per field, with 242 to 240 active and 13 to 21 reserved for blanked flyback. The display layout provides a 15 row by 15 column pattern to correspond to the 15 by 15 matrix employed in this exemplary embodiment. Additionally, 3.52 microseconds of scan time are reserved for each column and 16 lines are provided per row, with one line of each row being blanked to define the individual rows. Similarly, 200 nanoseconds of the scan time reserved for each column are blanked to define the separate columns.

The exemplary scan generator utilizes a 283.5 kilohertz (1/3.52 microsecond) clock as a time base. Note, that the clock is selected to match the time required to scan one column. The clock is obtained from a flip-flop toggled by a 567 KHz master oscillator illustrated in FIG. 9 by reference character 100. The master oscillator 100 is desirably phased locked to the 60 cycle power line and is compatible with the transistor-transistor logic employed in this embodiment, providing approximately a 5 volt output. The oscillator output is coupled to the toggle flip-flop 102, which divides the frequency by two to provide a symmetrical signal pulse width approximately equal to the time required to scan each column. The clock signal, thus produced, effectively divides each scan line into eighteen parts — 15 for active columns and three blanked for flyback. The division is controlled by a four-bit counter 104, driven by the clock output and a one-out-of-16 decoder 106, appropriately connected to the four-bit counter output. The decoder 106 has active low outputs (all outputs are high except for the one addressed by the counter output state 108), enabling direct connections between the first fifteen outputs $C_1$ through $C_{15}$ and the corresponding column select NAND gates, previously described with reference to FIG. 8. The 16th output of the decoder 106, designated by reference character $\overline{HB}$, is connected to a flip-flop 110, which inhibits the clock input, designated by reference character Q, to the counter 104, for two clock pulses when $\overline{HB}$ is active. Thus, the sixteenth state of the decoder 106 is maintained for three clock periods to provide the desired length for horizontal blanking. For the first 15 states of the four-bit counter 104, the output of the sixteenth state of the decoder 106 remains high and is communicated through inverter 120 to NAND gate 112 as a logical zero signal, maintaining the output, designated by count B, in the logical one state. Flip-flop 110 is a dual JK flip-flop appropriately connected as a three-state counter. Count B is desirably communicated to the suitable input of flip-flop 110 to normally maintain the output thereof in the zero state. The zero state respectively maintains the outputs $\overline{Q_1}$ and $\overline{Q_2}$ in the logical one state, enabling the inverted clock pulse $\overline{Q}$ produced at flip-flop 102 through inverter 116 and NAND gate 114 to counter 104. The capacitor 118 is provided at the output of inverter 116 to inhibit the clock pulse $\overline{Q}$ until the flip-flop 110 has reached equilibrium. Thus, the clock pulse enables the counter through its first 15 states providing the required sequencing pulses to the column select gates of FIG. 8 through the outputs of decoder 106, $C_1$ through $C_{15}$. When the counter 104 reaches the 16th state, the output of the decoder 106, $\overline{HB}$, transitions active low providing a logical one output at the inverter 120 to NAND gate 112, thus enabling the clock pulse Q to the flip-flop 110. Thus, in the 16th state of the decoder 106, count B, which is the inverted clock signal Q, transitions low, changing the output of flip-flop 110 to state one. State one maintains the output $\overline{Q_1}$ in the logical zero state, disabling NAND gate 114 from communicating the clock output $\overline{Q}$ to the counter 104. Throughout the 16th state of decoder 106, $\overline{HB}$ remains low enabling gate 112 to communicate the clock output Q to flip-flop 110, so as to sequentially transition the counter through its three output states. The next time the clock pulse transitions high, it puts flip-flop 110 in state two, providing an output which maintains $\overline{Q_1}$ high and $\overline{Q_2}$ low. Thus, in the second counter state $\overline{Q_2}$ continues to disable NAND gate 114 from communicating the clock pulse $\overline{Q}$ to the counter 104. The next clock pulse will again put flip-flop 110 back in the zero state and pass the clock pulse $\overline{Q}$ to the counter 104 changing to one-out-of-16 decoder 106 to state one on the next rising edge of the NAND 114 output, count $\overline{A}$. The net affect of the circuitry associated with flip-flop 110 is to maintain the decoder 106 in its 16th state for the three clock periods required for horizontal blanking. It should be noted that in this exemplary embodiment the counter designated by reference character 104 counts on the rising edge of the clock pulse communicated by count $\overline{A}$.

Accordingly, the column select gates of FIG. 8 are sequenced by decoder 106 through outputs $C_1$ through $C_{15}$ and the 16th output state of the decoder 106 is maintained for three clock periods to provide the required blanking for flyback before the next line on the cathode ray tube is swept. The relative occurrence of the outputs of the aforementioned circuitry, illustrated with reference to the aforegoing description, can be observed by reference to the timing diagram illustrated in FIG. 10. The $\overline{HB}$ output provided at inverter 120 is also connected to the clear inputs of flip-flop 110 to assure that flip-flop 110 remains in the zero state during the first fifteen states of decoder 106. The capacitors illustrated are used to slow down their associated signals to guarantee overlapping. Additionally, the horizontal blank signal $\overline{HB}$ is provided at the composite blank output 122 through NAND gate 124.

The horizontal synchronization signal is generated through the interconnection of NAND gates 126, 128 and 130 to the composite sync signal output 134 through inverter 132. As is known in the art, NAND gates 126 and 128 are basically interconnected to form a set-reset flip-flop. The waveshape of the horizontal synchronization signal can be observed by reference to the timing diagram illustrated in FIG. 10. A half cycle after the decoder 106 enters its sixteenth output state, $\overline{Q_1}$ transitions low and sets the reset flip-flop through the input to NAND gate 128, providing a logical one output which forms the horizontal synchronization signal. A cycle later, when $\overline{Q_1}$ transitions high, the output of NAND gate 130 will remain high, maintaining the flip-flop in its set position. Accordingly, the horizontal synchronization signal, provided at the output of NAND gate 128, is maintained for 1½ cycles after $\overline{Q_1}$ goes low. At the conclusion of the synchronization period, NAND gate 130 provides a reset signal at its output and the R-S flip-flop is not again set until the sixteenth state of decoder 106 is sequenced in the course of the next line scan.

Column blanking, which provides the requisite visual definition between columns, is provided by the one-shot illustrated by reference character 136. Each time the counter 104 is updated to sequence the next column select gate, the one-shot 136 provides a 200 nanosecond pulse at terminal 142 which forms the column blanking signal and appears at the composite blank output 122 through NAND gate 124. In the exemplary circuit design illustrated, terminal 138 is connected to the output of NAND gate 114, communicating count $\overline{A}$ to the input of one-shot 136 which, in turn, initiates the one-shot output pulse indicating counter 104 is being updated to its next counter state. The various outputs of the one-shot output pulse indicating counter 104 is being updated to its next counter state. The various outputs of the one-shot are desirably arranged, as is known in the art, so that when a logical one input is communicated to terminal 138, terminal 140 will transition high for a predetermined number of nanoseconds and pin 42, which is the inverse of pin 40, will transition low for the same period of time. The predetermined period of time referred to, is determined by the value of the resistor-capacitor arrangement coupled to terminals 144 and 146. Thus, every time count $\bar{A}$ goes high, a 200 nanosecond pulse is generated through terminal 142 to the composite blank 122 through NAND gate 124. Additionally, a second column blanking signal output is provided at terminal 140 for connection to the flash signal generator to be described.

The row selection signals required by the row selection gates, previously illustrated with reference to FIG. 8, are provided at the corresponding output terminals of the one-out-of-16 decoder 152, $R_1$ through $R_{15}$, respectively. Terminal 154 of counter 104 is commonly known in the art as the carry-out pin, normally producing a low output. When the counter 104 enters the 16th state, the output at temrinal 154 transitions high for one counter state and enables counter 148 through the enable input provided at terminal 156. Additionally, the count $\bar{A}$ signal, derived from the clock 102, is connected to the clock input terminal 158 of counter 148. A low input to the enable connection provided at terminal 156 of counter 148 will inhibit counter 148 from counting. When the enable transistions high, the counter advances to the next output state at the next clock pulse provided by count $\bar{A}$ at terminal 158. Thus, counter 148 counts once each time counter 104 reaches the 16th state. In the exemplary circuit shown, counter 148 is identical to counter 104 and counts on the rising edge of the clock pulse provided at terminal 158. However, counter 148 counts at the end of the 16th state of counter 104, due to the propagation delay which occurs between the input and output. Thus, at the end of each line of scan, counter 148 counts once, producing the line count. Accordingly, counter 148 counts up to 16 lines, representative of the sixteen lines per row in the display matrix. Similarly, entry into the zero state of counter 148 initiates an input to counter 150 which keeps track of the number of rows. The four output bits of counter 150 are connected to a second one-out-of-16 decoder 152, which drives the corresponding row select NAND gates illustrated in FIG. 8, through output terminals $R_1$ through $R_{15}$, respectively. The blanked horizontal lines, which define the rows within the matrix on the visual display, are generated by the four inverters illustrated by reference characters 160, 162, 164 and 166, respectively. Using counter 148 as a frame of reference, the four inverters blank the first line in each series of row lines scanned. Each time counter 148 is reset to the zero state, providing a 0000 input to the "collector ORed" array of the respective inverters 160, 162, 164 and 166 the common output of the inverters transitions high, providing a logical one input to inverter 168 and to the clock input of counter 150, enabling a count indicative of the next row to be scanned. The row blanking signal is communicated through inverter 168 to NAND gate 124, which adds the row blanking signal to the composite blank 122. Inverter 168 is provided to negate the inversion occurring at NAND gate 124 producing a positive composite blank signal at output 122.

Additionally, the row blanking signal provides a clock input to counter 150 each time counter 148 is reset to the zero state and according to the frame of reference assumed, blanks the first line in each row.

The four output bits of the counter 150 are fed into the four respective inputs of the one-out-of-16 decoder 152. As the counter sequentially advances counting from one to 15, the outputs $R_1$ through $R_{15}$ are sequentially changed from their high state to active low, providing the required signals for row selection to the corresponding row select gates illustrated in FIG. 8.

By the time counter 150 reaches the 16 state, 140 lines will have been scanned by the output monitor. This leaves approximately 23 lines to be blanked for vertical flyback and the vertical sync signal to be generated. This is accomplished by set-reset flip-flop 172 and the associative gates in the lower right of the schematic illustrated in FIG. 9.

The carry out pin of counter 150 is connected to the clock input of J-K flip-flop 186 which resembles the flip-flop previously described by reference character 102. The corresponding clear inputs 199, 198 and 200 to each of the counters 148 and 150 and to the flip-flop 186 are connected in parallel. When the clear inputs are provided with an active low signal they maintain the respective counters in state zero and the flip-flop output 202 in its low state. Prior to an active clearing signal, the output 202 of flip-flop 186, which is normally the inverse of the output 204, is maintained in the logical zero state. During this period, the output 202 of flip-flop 186 maintains the output of NAND gate 206 in the logical one state, providing a high input to the respective active low clearing terminals of counters 156 and 150 and flip-flop 186. The two inverters 208 and 210, maintained in series at the output of NAND gate 206, are inserted for delay purposes to enable the associative circuitry to reach steady state values before a signal is communicated.

Just prior to the time an active low signal appears at terminal 170 of the one-out-of-16 decoder 152, 240 lines on the visual output screen will have been displayed (sixteen lines per row for 15 rows). Upon reaching the sixteenth state of counter 150, terminal 170 of the one-out-of-16 decoder 152 transitions low and enables NAND gate 184 to pass the high output provided at terminal 204 of flip-flop 186, communicating a vertical blanking signal to the composite blank 122 through inverter 194 and NAND gate 124. The inverter 194 is provided to compensate for the inversion applied by NAND gate 124. Prior to the sixteenth state of decoder 152, the outputs 170 and 204 are sustained high maintaining an approximate zero output at NAND gate 184. Upon reaching the sixteenth state, the active low signal from terminal 170 passes the vertical blanking signal to the composite blank. The "collector ORing" of NAND gates 168 and 194 effectively provides an additional input to NAND gate 124.

It should be realized that during the sixteenth state of the decoder 152 the scan generator is still generating column selects and lines which are blanked due to the vertical blanking signal enabled by NAND gate 184. After 16 lines have been counted another clock pulse is enabled to counter 150 providing the next respective counter state and activating the counter carry-out at terminal 201. The transition in the carry-out causes the flip-flop 186 to toggle (change states) providing a one output at terminal 202 and a zero output at terminal 204. At the same time, the decoder 152 changes its active low output from terminal 170 to $R_1$. NAND gate 184 continues to be enabled through the low input provided by terminal 204 at the output of the J-K flip-flop 186 to continue to sustain the vertical blanking pulse active to the composite blank 122. By this time, the scan generator has counted approximately 256 lines. The high output appearing at terminal 202 is communicated to the input of NAND gate 206 so that when the first three least significant bits of counter 148 produce a high output, NAND gate 206 transitions low providing an active signal to clear counters 148 and 150 and flip-flop 186. The foregoing will occur at state seven of counter 148 providing enough time for the 263 lines comprising a scan field to be counted. The two series inverters and parallel capacitor 208, 210 and 218, respectively, are inserted to sustain the NAND gate output until the two counters and flip-flop are cleared. The active clear signal thus enables a high output at terminal 204 disabling NAND gate 184 from communicating the vertical blanking signal to the composite blank 122.

The vertical synchronization signal is supplied at the common output of the "collector ORed" array of inverters 188, 190 and 192 to the composite sync output 134 through inverter 196. Inverters 196 and 132 are similarly "collector ORed" to pass the horizontal and vertical sync signals to the composite sync 134. In order to obtain the desired vertical synchronization signal output, each of the respective inverters 188, 190 and 192 require a corresponding low input. The input of inverter 192 is connected to terminal 170 of decoder 152 and receives a low input as the decoder enters its 16th state. At the same time the output of counter 148 is at the zero state providing four zero output bits. The most significant bit provided at terminal 220 is directly coupled to the input of inverter 190. This bit remains zero for eight consecutive counter states and then provides a high input to inverter 190. The input of inverter 188 is derived from the output of the set-reset flip-flop 172, formed from the interconnection of NAND gates 174 and 176. The corresponding outputs of NAND gates 180 and 178 provide the respective set and reset signals to the flip-flop 172. When the output of NAND gate 180 transitions low, the set-reset flip-flop is set such that the input to inverter 188 is low. NAND gate 180 receives inputs respectively from the output terminals 212 and 214 of counter 148. A third input is additionally supplied from the output terminal 216 of counter 148 through inverter 182. Accordingly, the output of NAND gate 180 transistions low when output terminals 212, 214 and 216 transition high, high and low, respectively, during state three of counter 148. Thus, three lines after the vertical blanking signal occurs, a set signal is applied to the set-reset flip-flop 172 enabling a low input to inverter 188. At the same time, the inputs to inverters 190 and 192 are low enabling a vertical synchronization signal to the composite sync 134 through inverter 196. A reset signal is applied to the input of flip-flop 172 when the output of NAND gate 178 shifts low. NAND gate 178 receives inputs directly from the output terminals 214 and 216 of counter 148. Accordingly, a reset signal is applied to flip-flop 172 three lines later when terminals 214 and 216 transition high, terminating the vertical sync signal.

Figure 10:
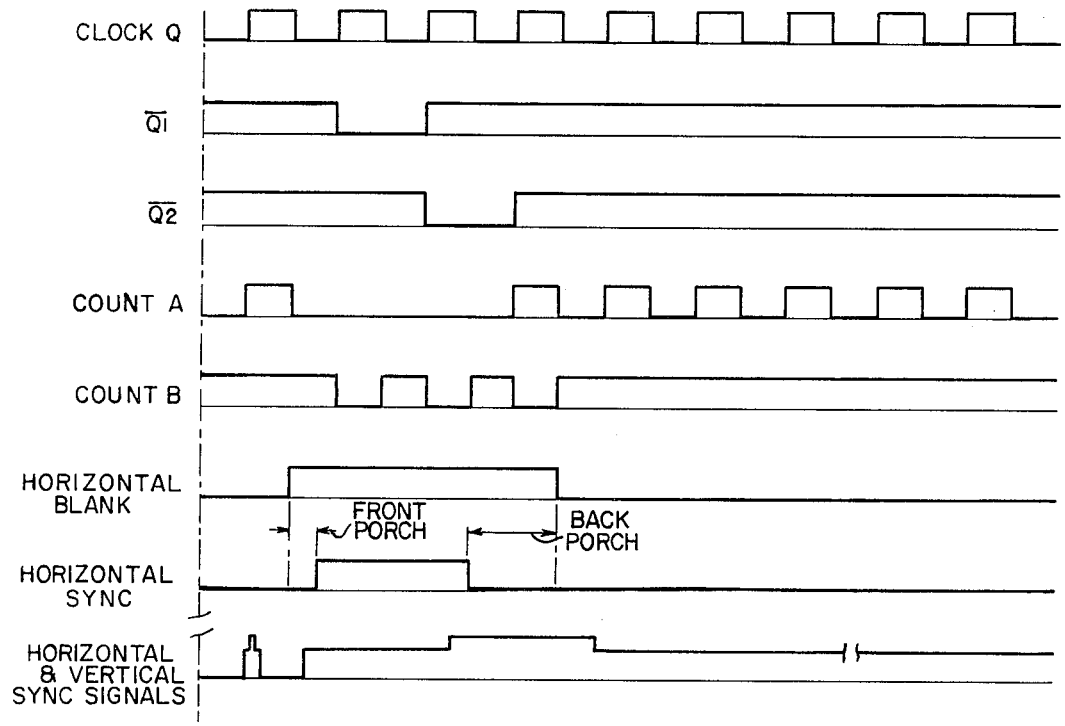
FIG. 10 is a graphical illustration of the intermediate outputs of the circuit of FIG. 9 provided to illustrate the operation thereof.
Figure 11:
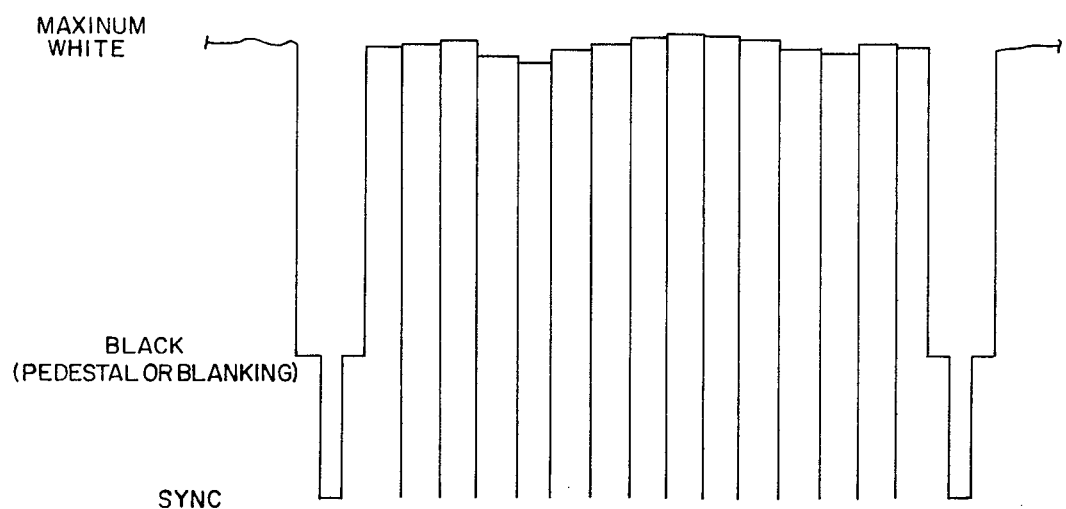
FIG. 11 is a graphical illustration of an examplary video signal produced in the exemplary embodiment illustrated in FIG. 7.

A typical vertical blanking and synchronization pulse without equalizing pulses or serrations is illustrated in FIG. 10 showing the relative position of the vertical synchronization pulse within the vertical blanking pulse. Additionally, the relative time durations of the horizontal synchronization pulse and the vertical synchronization pulse are also shown. By referring to the graphical illustration of the horizontal blanking pulse and the horizontal sync pulse it can be observed that synchronization pulses are generally characterized by what is commonly known as a front porch and a back porch. The front porch precedes the sync pulse and represents the time duration between the beginning of horizontal blanking and the beginning of the synchronization pulse. The back porch follows the termination of the sync pulse and signifies the time between the termination of the synchronization pulse and the blanking pulse. Ideally, for the horizontal synchronization signal, the front porch and the back porch are approximately 0.02 and 0.06 times the period of one line scan, respectively. While in the aforementioned graphical illustration, the synchronization pulses are shown as positive pulses, they actually appear in the composite video signal as negative going pulses. FIG. 11 illustrates a typical composite video signal showing the varying intensities of white interrupted by a black or pedestal level produced by the blanking signal and a blacker than black sync level produced by the composite sync signal. Although not shown, the horizontal sync is distinguished from the vertical sync by the duration of the pulse, as previously described.

Thus, the scan generator described provides: a composite blank signal which includes the column blanking signal, the horizontal blanking signal and the vertical blanking signal; a composite sync signal which includes the horizontal synchronization signal and the vertical synchronization signal; and the appropriate row and column select signals for the row and column select gates previously described with reference to FIG. 8. Additionally, an alarm feature is included, labeled flash blanking, which is provided as an input to the composite blank signal through NAND gate 124. The flash blanking signal indicates an out of limits reading received from an in-core thermocouple and provides a signal to flash a portion of the corresponding block on the visual display. The circuitry required to provide the flash blanking input will be described hereinafter.

The final video processing is achieved by the circuitry illustrated in FIG. 12. An input from the video line of FIG. 8 is inserted at terminal 220 and inputs from the composite blank and composite sync outputs of the scan generator illustrated in FIG. 9 by reference character 122 and 134 are inserted at terminals 222 and 224, respectively. A parallel composite sync input signal is additionally applied to terminal 226. Furthermore, a signal from the flash signal generator, responsible for generating the flash alarm previously described with reference to the description of flash blanking is inserted at terminal 228. Additionally, two outputs are provided for accommodating the two types of video monitors previously described. A composite video signal is provided at terminal 232 and a separate composite sync output is provided at terminal 230.

The operation of the video processing circuitry can be understood from the following description. A constant current source is provided in the block designated by reference character 234. Generally, the field effect transistor 236, connected as shown with the gate coupled to the source, provides a constant current source to the Zener diode 138 which maintains a stable voltage across its terminals. The resistor 240 is inserted to stop parasitic oscillations in the transistor 242. The field effect transistor 236 and Zener diode 138 arrangement presents a defined voltage at the base of transistor 242, as referenced to the voltage source applied at the emitter thereof. Thus, a constant current flows through the emitter and out the collector of transistor 242. The amount of current supplied is determined by the voltage across the Zener diode 238 and the value of the emitter resistor. The constant collector current provides a linear voltage gradient across the potentiometer 244. Thus, the potentiometer 244 may be adjusted to vary the pedestal level of the video output. The voltage at the base of transistor 246 is equal to the video input applied at terminal 220 and the voltage at the emitter is 1 diode drop above this base voltage. Thus, the emitter of 246 and the tap terminal of potentiometer 244, follow the fluctuations in the video line voltage. Accordingly, the base of transistor 248 is at the video line voltage plus a DC value equal to the pedestal level determined by the setting of the potentiometer 244 plus one diode drop. The collector of transistor 248 has a Zener diode 250 connected in parallel to maintain the collector voltage at an acceptable low level. The resistor 252 in parallel with the emitter of transistor 248 is inserted to maintain current flowing through the transistor at all times. Therefore, transistor 248 always remains on. The two resistors 254 and 256, coupled to the emitter of transistor 248, function as a voltage divider to obtain the proper amplitude for the standard video output appearing at terminal 232. Transistor 258 is connected as a voltage follower; the emitter following the voltage applied at the base. The emitter of transistor 258 is connected to the base of transistor 260 which acts as an output driver providing the composite video signal at its emitter. Resistor 262 biases transistor 260 into a conducting state and resistor 264 is inserted to match the impedance of the monitor. The capacitor provided at the collector of transistor 260 functions as a decoupling capacitor.

The composite blank signal generated from the scan generator is inserted at input terminal 222. When the composite blank is low it biases transistor 266 off so that the collector does not draw any current from the video signal appearing at the base of transistor 258. When the composite blank signal transitions high, it turns on transistor 266, which short circuits the video signal to approximately ground. Accordingly, transistor 266 acts as an ON/OFF switch blanking the video output according to the composite blank input provided at terminal 222.

As previously mentioned, the composite synchronization signal is inserted at temrinals 224 and 226, respectively. The signal provided at terminal 224 is fed through an inverter 268 to transistor 270. When the composite synchronization signal is high, the output of the inverter 268 is low shutting off transistor 270 and disconnecting the associative circuitry from the video signal appearing at the emitter of transistor 258. When the composite synchronization signal is low, the output of the inverter 268 is high, which turns on transistor 270, and clamps the video signal to the adjusted voltage set by the potentiometer 272 in series with the emitter of transistor 270. The net result provides a negative voltage at the video output, determined by the setting of the potentiomeer 272 and the parallel diode. The two diodes in series with the base of transistor 270 are provided to assure that transistor 270 is off when the inverter 268 is in the low state.

The other composite sync input appearing at terminal 226 is provided to produce a composite sync output compatible with those monitors requiring two separate inputs. The two transistors associated with input terminal 226 act as voltage follower amplifiers to supply a compatible output for such monitors.

The flash generator which will be described with reference to FIG. 13, provides two outputs for the flash alarm previously mentioned. The first output is designated flash white and is inserted at terminal 228. The second output is called flash blanking and is inserted at the flash blanking input to the scan generator described with reference to FIG. 9. The flash blanking signal appears in the composite blanking signal through NAND gate 124 of FIG. 9 and is inserted into the video processor at terminal 222.

When the flash white input to terminal 228 is high, it turns transistor 274 off and disconnects the voltage source appearing at the emitter from the video signal appearing at the emitter of transistor 248. When the flash white signal is low, indicating a flash alarm, it turns transistor 274 on which applies the voltage appearing at the emitter thereof to the video signal appearing at the emitter of transistor 248. The resulting signal places a white image on the monitoring screen for the period that transistor 274 is on. The resistor appearing at the collector of transistor 274 limits the voltage across transistor 248 to an acceptable level. The diode appearing at the base of transistor 274 is inserted to assure the transistor is off when required. Additionally, the capacitor 276 speed up the switching operation of the transistor. The capacitor 278 provided at the base of transistor 266 functions in the same manner.

Thus, the video processor receives the various separate inputs associated with the composite video signal and processes them in acceptable form to be fed into a standard video monitor.

The flash signal generator, referenced in the description of the video processor, is illustrated in FIG. 13. Generally, the flash signal generator determines whether the particular thermocouple readout being addressed is within acceptable limits. The acceptable limit reference signals are provided by the circuitry designated by reference character 280, and are determined by the particular thermocouples employed and the reactor operating conditions encountered. The circuit designated by reference character 280 provides upper and lower reference signals 282 and 284, respectively, which are fed into a comparator circuit at the corresponding terminals 286 and 288. The upper reference signal is communicated to the positive input of comparator 290 and the negative reference signal is communicated to the negative input of comparator 292. The remaining inputs to the two respective comparators are provided from the video line output illustrated in the circuit of FIG. 8. If the video voltage is larger than the upper reference voltage, the output of operational amplifier 290 to NAND gate 296 will be low. Similarly, if the video signal is below the lower reference voltage the output of operational amplifier 292 to NAND gate 296 will be low. If either of the aforementioned outputs of either operational amplifier 290 or 292 is low, NAND gate 296 will provide a high output to the gates associated with the flash blanking terminal 294 and the flash whitening terminal 298. The outputs appearing at terminals 294 and 298 form the inputs for flash blanking and flash whitening provided in the circuitry of FIGS. 9 and 12, respectively. The circuitry associated with the output of NAND gate 296 is provided to inhibit the flash outputs from appearing at terminals 294 and 298 until a half square is presented to the appropriate matrix box appearing on the visual display, corresponding to the sensor being monitored by the video line. Accordingly, the left half of the respective square in the output matrix will indicate the relative intensity of the thermocouple monitored while the right half of the square will indicate whether the temperature monitored is outside acceptable limits.

The flash inhibiting circuitry receives an input from the column blanking signal CB provided at output terminal 140 of the circuit of FIG. 9. The CB input is applied to terminal 300 at the base of transistor 302. When the CB signal transitions high, transistor 302 is turned ON bringing the collector voltage from its collector source value to approximately ground. This voltage is transmitted to the base of transistor 304 through a capacitor 308, biasing transistor 304 in its off state and raising its collector from approximately ground to the voltage level applied at the collector. This collector voltage is in turn applied to the base of transistor 302 through a diode 301 locking transistor 302 in it ON state, irrespective of the voltage applied at terminal 300. At the same time, the voltage at the base of transistor 304 is approximately −4.3V. The capacitor 308 charges through resistor 306 until reaching approximately 0.7V. When the capacitor has charged, transistor 304 is turned ON, dropping its collector voltage to approximately ground potential. The circuit elements are chosen to allow approximately 2 microseconds for the completion of this cycle, as compared to the 200 nanosecond pulse applied by the column blank signal appearing at terminal 300. Therefore, by the end of the cycle, the column blank signal will have gone low. The value of the RC combination, comprising resistor 306 and capacitor 308, controls the duration of the gating signal apeparing at the collector of transistor 302 which inhibits the output of NAND gate 296 from appearing at the output terminals, 294 and 298. At the end of the cycle, transistor 302 returns to its off state raising the collector potential to the value of the collector voltage source. In the course of the cycle, when the collector of transistor 302 drops to approximately ground potential, it sets the set-reset flip-flop 310, formed by the interconnection of NAND gates 312 and 314, such that the output provided by NAND gate 312 transitions low inhibiting the flash blank and flash white output at terminals 294 and 298, respectively. At the end of the cycle, when the collector of transistor 302 shifts high, flip-flop 310 is reset (if provided with a high output from NAND gate 296), enabling NAND gates 318 and 322 to pass a flash blanking and flash whitening signal at terminals 294 and 298, respectively. If an out of limits signal is not indicated by the output of nand gate 296, then the flash blanking and flash whitening signal will not appear. NAND gate 320 merely acts as an inverter to provide an inverted oscillator output to NAND gate 318. NAND gate 322 is directly coupled to the oscillator 324. Accordingly, when an out of limits signal is transmitted to gates 318 and 322 the oscillator will alternately enable the respective gates to provide a flash blanking and flash whitening signal alternately at terminals 294 and 298.

As previously stated, the circuitry associated with reference character 280 provides the temperature compensated reference voltage source for supplying the upper and lower reference voltages to the comparators 290 and 292, respectively. The Zener diode 326 provides a constant voltage source to the matched pairs of transistors 328 and 330 and 332 and 334, each pair desirably carrying approximately the same value of current. The potentiometers 338 and 336 are employed to adjust the value of the upper and lower reference voltages 282 and 284, respectively. As the operating temperature varies the voltage at the lower end of the potentiometers 338 and 336 adjust according to the temperature coefficient of the base-emitter junction of transistors 328 and 332, respectively, compensating the corresponding base-emitter junction voltages of transistors 330 and 334. Transistors 330 and 334 additionally supply some power amplification to the corresonding reference voltages. The resistor-capacitor arrangements positioned intermediate the potentiometers and transistor bases function as standard decoupling circuits. The emitter resistors 340 and 342 are desirably chosen to maintain approximately the same value of current through the corresponding matched transistors so that any variation in base-emitter voltage with temperature within transistors 334 and 330 will be compensated for respectively by transistors 332 and 328.

Figure 14:
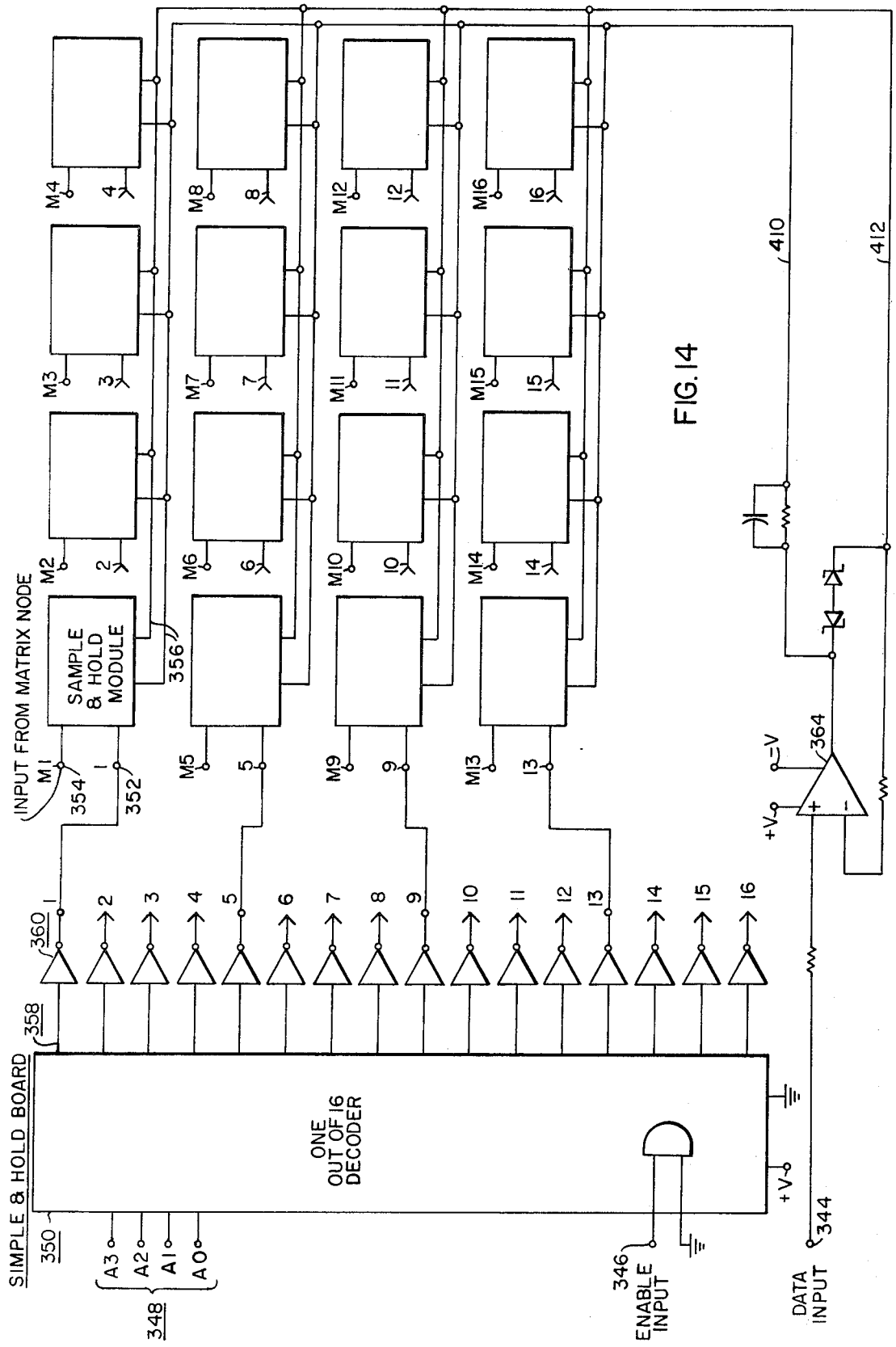
FIG. 14 is a schematic diagram of an exemplary sample and hold interface employed to drive the resistor interpolator of FIGS. 3 and 4.
Figure 15:
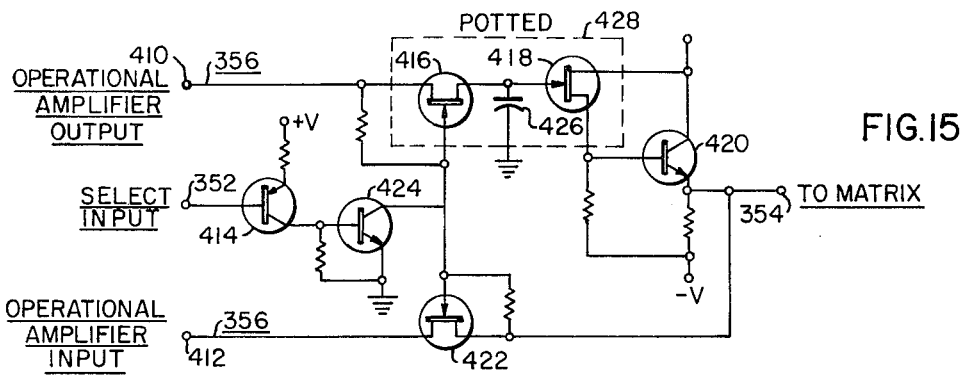
FIG. 15 is a schematic circuitry diagram of an exemplary analog sample and hold module employed in the circuit of FIG. 14.
Figure 16:
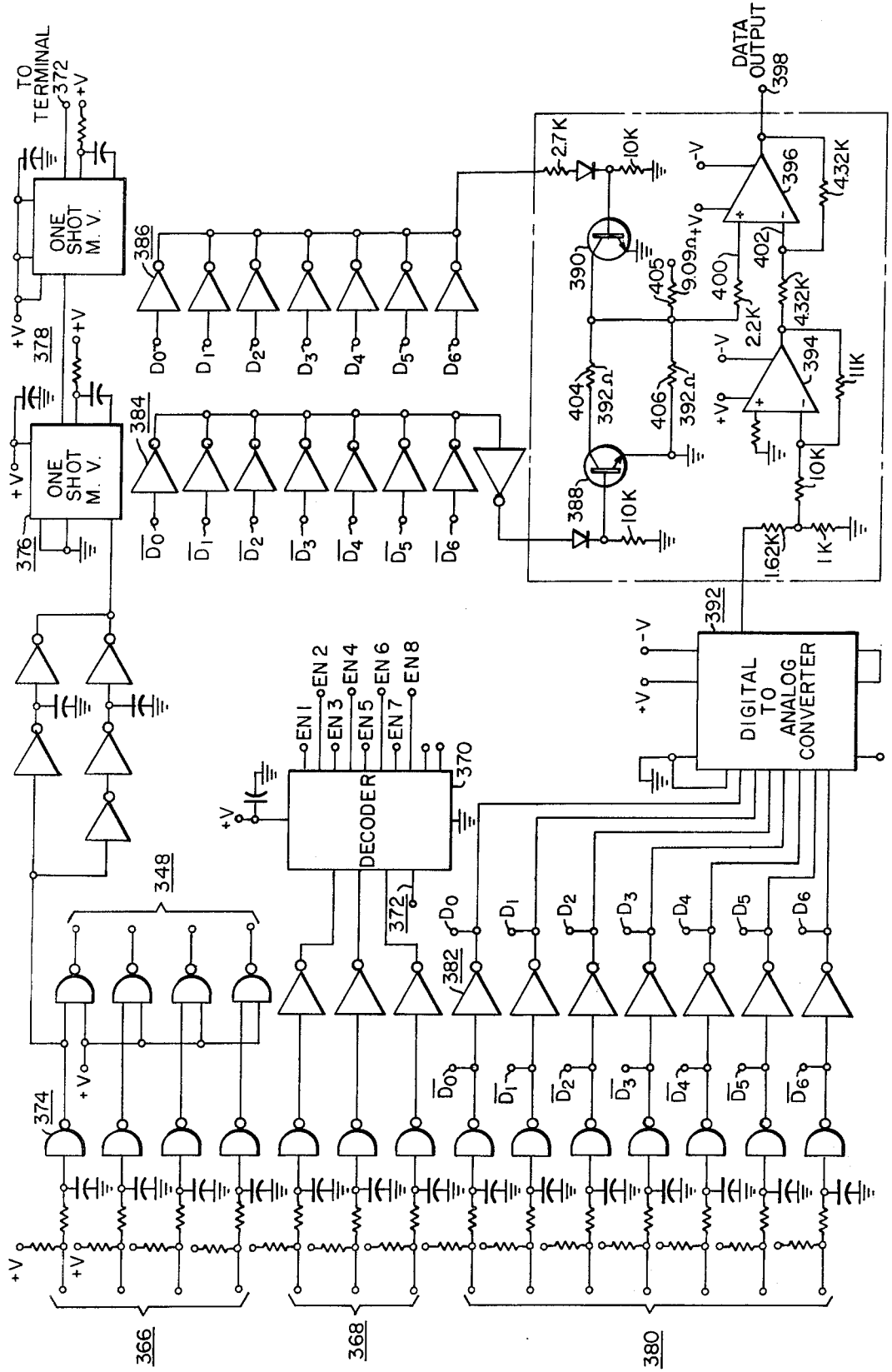
FIG. 16 is a digital interface and digital to analog conversion board employed to interface a nuclear reactor supervisory computer with the circuit of FIG. 14.

Referring again to the schematic system diagram illustrated in FIG. 7, it will be recognized that the operational description hereinbefore PRESENTED describes the various stages of signal processing required to produce a composite video signal, which when connected to a standard TV monitor will display a relative intensity visual map of the in-core thermcouple interpolated values. It should be understood, however, that the aforementioned visual display is neither limited to an application to nuclear reactors nor to a readout of thermocouple values, but may be employed in conjunction with any group of sensors positioned to monitor a defined area. Under circumstances where the sensors can be directly coupled to the respective matrix nodes, a totally operable system is formed by the circuitry thus far described. However, the unique operating conditions encountered in a nuclear reactor environment necessitate additional signal processing and conditioning before the sensor outputs can be operably coupled to the corresponding matrix nodes. The circuitry employed in the following description provides the requisite signal conditioning and processing necessitated by a nuclear reactor environment. FIGS. 14 through 16 illustrate various stages of interface circuitry employed to couple the resistor matrix nodes with the outputs of the nuclear reactor surveillance computer, supplied in existing nuclear plants. Additionally, FIGS. 17 through 20 illustrate an alternate embodiment of interfacing circuitry supplied to directly couple the thermocouples to the resistor matrix.

FIG. 14 illustrates a sample and hold circuitry board employed to store the readout data obtained from the in-core thermocouples so that they can be simultaneously presented to the corresponding nodes of the matrix.

The reactor plant surveillance computer provides a seven bit address output. The four least significant bits of the address signify which sample and hold module is to be connected, and the three most significant bits signify which sample and hold board within the interface is to be activated. The sample and hold board illustrated in FIG. 14 employs 16 sample and hold modules 362, each module corresponding to an in-core thermocouple and respective node of the matrix. The three most significant bits of the address provide the capacity to sequence eight such sample and hold boards. Each sample and hold board functions in the same manner as the board illustrated in FIG. 14 and therefore the operational description to follow may be applied to each.

The one-out-of-sixteen decoder designated by reference character 350, is similar to the decoders previously described with reference to the scan generator illustrated in FIG. 9. The four inputs designated by reference character 348 correspond to the four lower bits of the computer address. The various states of the four address inputs sequentially energize the 16 outputs 358 from hight to active low and in turn couple the respective sample and hold modules 362 at the corresponding inputs 352 through inverters 360. The input 346 functions to enable the decoder 350 when addressed by a separate interface to be described. Additionally, the computer provides a data input, representative of the thermocouple value addressed, which is applied to the sample and hold board at data terminal 344. The data terminals on the respective eight sample and hold boards are continuously activated by the computer input and are engaged or disengaged from the respective sample and hold modules 362 according to the enable and address inputs provided by the computer address. Thus, when a particular thermocouple is being addressed, the appropriate board is enabled through its enable input 346 and the appropriate sample and hold module 362 is enabled through the address input 348, coupling the appropriate sample and hold input terminals 356 to the data line 344. When a particular board is not being addressed (disabled through its enable terminal 346) each of the sample and hold modules are disengaged from the data line 344.

FIG. 16 illustrates the circuitry provided for the computer digital address interface and the data digital to analog conversion. The surveillance computer is programmed to sequentially address the thermocouples in numerical order, the corresponding address appearing at input lines 366 of the computer digital interface. The enable signal for the sample and hold board select is derived from the least significant bit of the computer address. The board select enable signal is taken at the output of the corresponding NAND gate 374 which produces a pulse whenever the least significant bit changes. The output thus obtained is communicated to a series arrangement of two "one shots" through an inverter array. The first "one shot" 376 produces a 1 millisecond pulse at each transition. At the conclusion of the first one millisecond pulse the second "one shot" produces a 1.5 millisecond pulse which is communicated to the enable input 372 of the one-out-of-eight decoder 370. Decoder 370 is similar to the decoders previously described with reference to the scan generator illustrated in FIG. 9, and sequentially energizes the eight outputs labeled $EN_1$ through $EN_8$ to the respective enable inputs of the individual sample and hold boards. The first 1 millisecond pulse produced by "one-shot" 376 provides enough of a delay time for all of the computer contact closure relays to reach a stable state and the data to be presented to the appropriate data lines on the individual sample and hold boards. The second 1.5 millisecond pulse signifies the go-ahead to the decoder 370 to select the appropriate board to be energized. Each board is then energized 16 times as each individual sample and hold unit on the respective board is addressed according to the corresponding thermocouple addressed by the computer.

The computer software runs an out of limits check on the data reading received from each thermocouple. If an out of limits reading is indicated, the computer output provides either an all zero or all one input to the data terminals 380, signifying either a low limit or high limit reading, respectively. The seven bit digital data input 380 is converted into an analog signal by the digital to anlog conversion board for output to the data inputs of the individual sample and hold boards. The transformation is accomplished utilizing a digital to analog converter 392. The respective data bits are presented to the corresponding inputs of the digital to analog converter through a series array of corresponding inverters 374 and 382. Inverted bit outputs are taken at the inputs to the respective inverters 382 and are presented at the corresponding inputs of the "eollector ored" array of inverters 384. Similarly, the outputs of the respective inverters 382 are presented to the corresponding inputs of the "collector ored" array of inverters designated by reference character 386. The circuitry associated with the inverter arrays 384 and 386 is provided to alter the output of the digital to analog converter 392 during the occurrence of either an all zero or all one digital input to the data terminals 380, to aid the comparator of the circuit of FIG. 13 to distinguish between an all zero or all one digital input and an input where six of the digital data bits assume either the one or zero state and the seventh digital bit assumes the alternate state. In the event of an all zero input to the data terminals 380 each of the individual inputs to the inverters in the inverter array 386 assume the zero state, enabling the array to produce a positive output biasing transistor 390 ON and essentially grounding its collector. The resultant input 400 to operational amplifier 396 effectively drops its output by approximately 0.2 volts, exaggerating the out of limits signal to the comparator circuit of FIG. 13. Operational amplifier 396 is interconnected to provide an output at terminal 398 approximately equal to the voltage appearing at terminal 400 minus the voltage appearing at terminal 402. The voltage at terminal 402 is already negative due to the processing applied at the output of the digital to analog converter 392 by operational amplifier 394. When an all zero input appears at the corresponding input terminals of the inverter array 386 and transistor 390 is turned ON, input terminals 400 and 402 of operational amplifier 396 are essentially grounded communicating an approximate zero output to the data line at terminal 398. When at least one input to the inverter array 386 assumes the one state, a zero output is provided at the base of transistor 390, open circuiting its collector and effectively raising the voltage applied at terminal 400 to approximately 0.2 volts. The input applied at terminal 402 is still approximately zero, however, the output appearing at terminal 398 is raised to 0.2 volts which is a relatively large jump over the zero output provided by an all zero data bit input. It should be understood that the circuit values and voltages described are presented to aid in an understanding of the operation of this invention and are not meant to be limitative thereof.

Similarly, when all the data bits assume the one state, the respective inputs to the inverter array 384 provide a logical one output to a series connected inverter, which in turn provides a logical zero at the base of transistor 338, effectively open circuiting its collector. Resistors 404 and 406 function as a voltage divider in parallel with resistor 405. When the collector of transistor 388 is open circuited, resistor 404 is deleted from the operational amplifier input circuit. In accordance with the exemplary circuit values illustrated, approximately 0.4 volts are applied to input terminal 400 of operation amplifier 396 raising the output thereof by approximately the same value. On the other hand, when at least one of the data input terminals 380 assumes the zero state, the zero data input bit effectively alters the output of NAND array 384, which then provides a zero output to the series inverter and a one input to the base of transistor 388, turning transistor 388 ON and essentially grounding its collector. With the collector of transistor 388 grounded, resistor 404 is inserted into the operational amplifier input circuit dividing the input to terminal 400 by two and effectively raising the output by 0.2 volts over the value appearing at terminal 402. Accordingly, the circuitry associated with the NAND array 384 distinguishes the output derived from an all one data input from an input wherein at least one of the data bits assumes the zero state. Without the NAND array, both of the aforementioned data inputs would provide approximately the same output at data terminal 398, potentially incapacitating the out-of-limits circuitry of FIG. 13 from providing an accurate out-of-limits alarm.

The surveillance computer software reserves one address location for displaying a failed in-core thermocouple. When a failed thermocouple is detected, and the appropriate address is provided by the computer software, a corresponding box in the corner of te display readout matrix will be illuminated. The readout location reserved for this purpose is illustrated in FIG. 1 by reference character 408. The video signals required for producing the failed thermocouple alarm are processed by the aforementioned circuitry components in the same manner as the thermocouple signals previously described. In order to avoid disrupting the interpolation process, the portion of the resistor matrix associated with this value is isolated from the rest of the matrix nodes and a separate sample and hold module is provided on the corresponding sample and hold board. Additionally, the portion of the video screen not employed in the visual readout is desirably grounded or held at a relatively low potential to form the outline of the readout core map.

The data output terminal 398 is connected to the respective input terminals 344 of the corresponding sample and hold boards illustrated in FIG. 14. The data input is then communicated through the positive input of operational amplifier 364 to the respective sample and hold modules. Operational amplifier 364 is provided with a feedback line coupled between its output and negative input having two Zener diodes in series with a resistor. Additionally, a parallel resistor-capacitor arrangement is supplied in series with the amplifier output. The resistor-capacitor arrangement functions to stabilize the output response and the series arrangement of Zener diodes is supplied to limit the output voltage swing between extremes when the particular board considered is not addressed by the surveillance computer.

A more detailed understanding of the operation of the individual sample and hold modules illustrated in FIG. 14, can be had by reference to the following description provided in conjunction with the circuitry illustrated in FIG. 15. Corresponding reference characters refer to corresponding terminals on the two figures. Operational amplifier 364 provides inputs 410 and 412 to the corresponding inputs 356 of the analog sample and hold modules. The corresponding decoder outputs 358 are fed through a series inverter 360 to the select input terminal 352 of the respective sample and hold module. Accordingly, an active low decoder output will appear as an active high select input to the appropriate analog sample and hold. When a high select signal is received by terminal 352, transistors 414 and 424 are biased in their off state, open circuiting their collectors and biasing field effect transistors 416 and 422 into a conducting state, connecting the module to the data operational amplifier's outputs 410 and 412. The capacitor 426 charges until the emitter of transistor 420 is raised to approximately the same voltage level as the data input to the operational amplifier 364. When the address select 352 transitions low, transistors 414 and 424 are turned ON, lowering the voltage level appearing at the collector of transistor 424 to approximately the voltage level applied at the emitter. This voltage biases the field effect transistors 416 and 424 into a non-conducting state. The characteristic high input impedance of the field effect transistors functions to maintain the voltage appearing across the capacitor 426 until the select input 352 again transitions high. Each time the computer addresses a particular sample and hold module, to update the thermocouple reading, the capacitor 426 charges to the proper level through the drain of field effect transistor 416. Thus, the sample and hold sustains the output voltage provided to the matrix nodes at terminals 354, until updated. Accordingly, each of the matrix nodes are simultaneously presented with their respective thermocouple readings for interpolation. The two filed effect transistors 416 and 418 and the capacitor 426 are potted to protect against moisture which might otherwise result in a loss of the current associated with the charged capacitor 426.

The data output presently available from the plant surveillance computer software provides a readout indicative of the relative temperature of the core normalized to the temperature of the coolant at the reactor vessel inlet. Thus, the visual temperature display, of the exemplary embodiment described, will present a relative intensity pictorial map of normalized temperature values.

The following description, presented in conjunction with FIGS. 17 through 20, provides an alternate embodiment of an interface which may be employed within a nuclear environment. The alternate interface obviates the necessity of using the plant surveillance computer, enalbing direct connection of the respective thermocouples to the corresponding sample and hold assemblies previously described.

Figure 17:
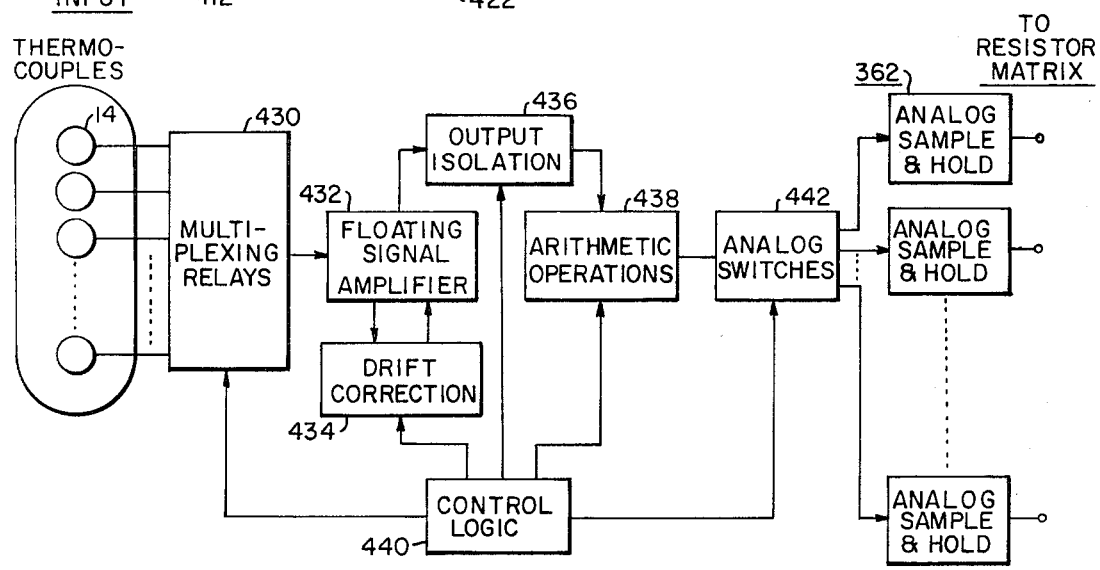
FIG. 17 is a schematic block diagram of an alternate exemplary embodiment which may be employed with this invention to interface the thermocouple sensors with the resistor interpolator illustrated in FIGS. 3 and 4.

The multiplexed relays, illustrated in FIG. 17 by block 430, connect the respective in-core thermocouples addressed by the control logic 440 to the floating amplifier 432. Block 432 amplifies the voltage appearing across the thermocouple terminals, without reference to ground, feeding the output to an isolation unit 436. The drift correction unit 434 compensates the floating amplifier 432 for variations in its associative components due to age, temperature and time. The control logic 440 is desirably coupled to the drift correction unit 434 to instruct the intervals of compensation. The output isolation unit 436 buffers the floating amplifier output and provides a corresponding input compatible with the grounded circuitry. The control logic 440 is coupled to the output isolation unit 436 to provide the necessary sequencing. An arithmetic operation unit 438 is included to perform any desired normalizing (i.e., referencing the thermocouple temperatures to the reactor coolant inlet temperature). Similarly, a connection is provided between the control logic 440 and the arithmetic operations unit 438 to provide the required sequencing. The data output from the arithmetic operations unit is fed through an analog switching unit 442, which performs the function previously provided by the address decoder illustrated in FIG. 14, to load the appropriate analog sample and hold module 362. The corresponding outputs of the respective sample and hold modules 362 are processed in a similar manner to that previously described.

Multiplexing relay systems such as the system described by block 430 are well known in the art. The relays function to sequentially connect the in-core thermocouples to the floating signal amplifier according to a clock signal provided by the control logic 440.

Figure 19:
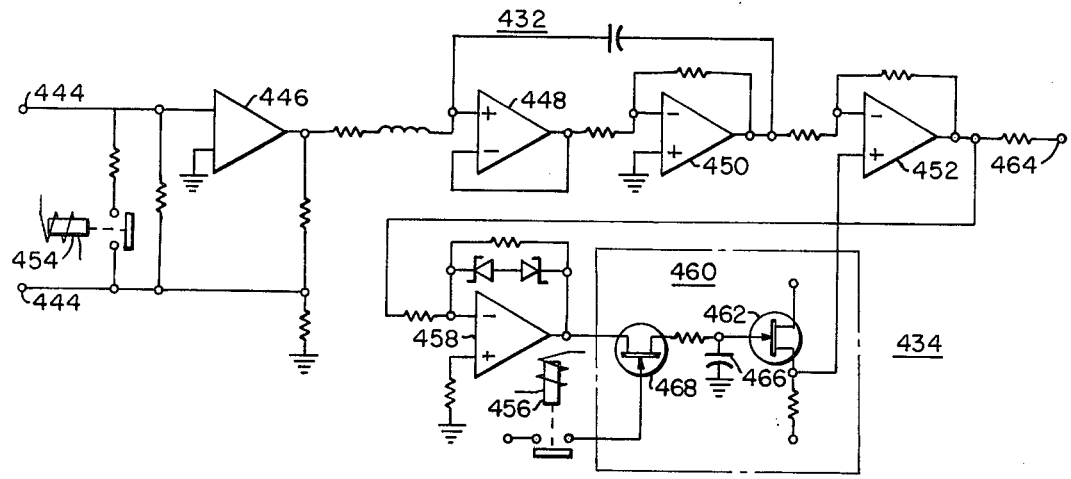
FIG. 19 is a schematic circuitry diagram illustrating an exemplary embodiment of the floating signal amplifier illustrated in block form in FIG. 17.

The floating amplifier illustrated by block 432 in FIG. 17, is shown in more detail in FIG. 19. The signal received from the particular thermocouple being addressed by the multiplexing relay unit 430 is electrically communicated to the input terminals of the floating amplifier 444 and serially processed through a plurality of operational amplifiers 446, 448, 450 and 452 to the floating amplifier output 464. In the exemplary circuitry shown, operational amplifier 446 is a field effect transistor operational amplifier providing a high input impedance to the thermocouples. The circuit arrangement employing operational amplifiers 448 and 450 form an active filter which functions to filter out the 60 cycle noise associated with the thermocouple input signal. Operational amplifier 452 supplies a final amplification stage and acts as a buffer to the output 464. Additionally, operational amplifier 452 is connected to the drift correction circuitry 434 and functions to correct the operational amplifier output according to the signal received from the drain of the field effect transistor 462. The drift correction circuitry 434 is provided in a feedback loop between the output of operational amplifier 452 and its positive input. Contact closures 454 and 456 are provided to activate the drift correction circuitry 434, to update the operational amplifier correction according to the clock signal received from the control logic 440. When the contact closure 454 is activated by the control logic signal it functions to short-circuit the input signal supplied to terminal 444. At the same time, contact closure 456 is opened to enable the sample and hold circuitry 460 of the drift correction unit 434. The operation of the sample and hold unit 460 is analogous to that described for the sample and hold modules 362. Accordingly, capacitor 466 charges to an adequate voltage level to zero the output of operation amplifier 452. The feedback arrangement provided operational amplifier 452 tends to equalize the voltages appearing at the positive and negative inputs thereof. Operational amplifier 458 receives an input from the output of operational amplifier 452 providing an output current which charges the capacitor 466 when the sample and hold unit 460 is energized. When contact closure 456 is closed, the gate of field effect transistor 468 is brought negative, disconnecting the transistor and open circuiting the feedback loop. The capacitor 466 maintains its charge due to the high input impedance appearing at the gate of field effect transistor 462. The capacitor voltage is then communicated through the source of field effect transistor 462 to the positive input of operational amplifier 452, providing the correction signal required to compensate the output 464. Contact closures 454 and 456 are operated at approximately the same time to again enable the thermocouple input 444. The supply voltage required by the floating amplifier are derived from a floating power supply desirably employing shielded transformers. Such power supplies are well known in the art.

Figure 18:
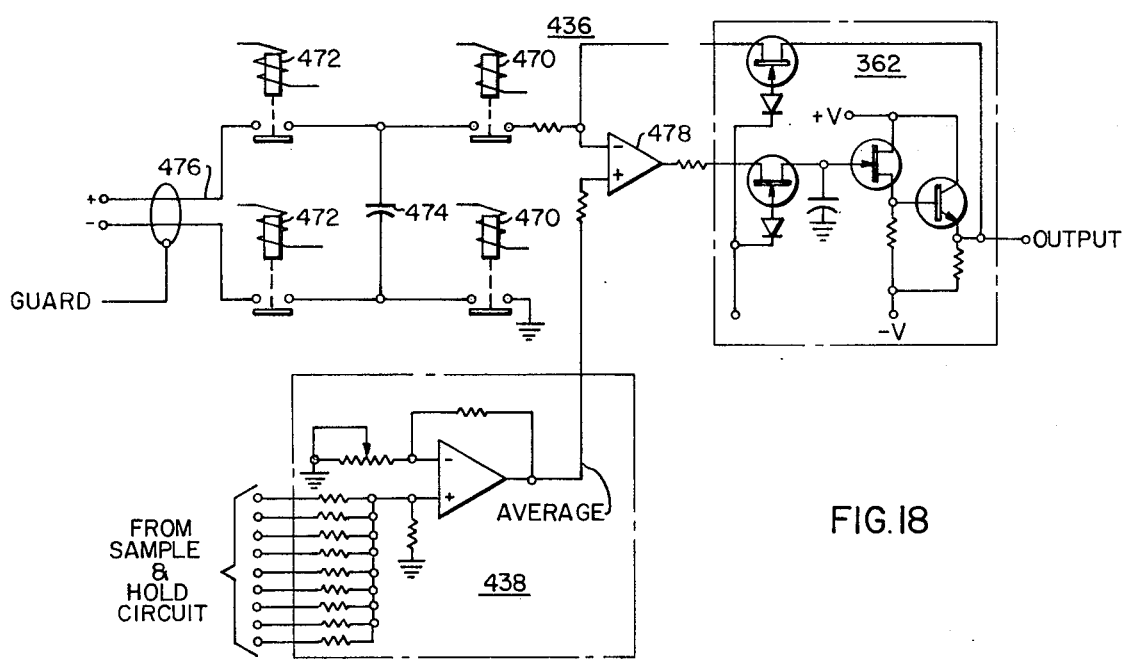
FIG. 18 is a schematic circuitry diagram of an exemplary output isolation and arithmetic operations unit illustrated in block form in FIG. 17.

FIG. 18 illustrates an exemplary embodiment of the isolation unit 436. For purposes of description, the output of the isolation unit 436 is shown directly connected to an individual sample and hold module 362. In the actual system, an intermediate interface 442 will be interposed to address the proper sample and hold module 362, corresponding to the particular thermocouple connected by the multiplexing relay unit 430. Additionally, an exemplary averaging circuit 438 is shown for normalizing the thermocouple signals to the average read out from the individual sample and hold circuits 362. The normalization provided is an optional feature which may be included to obtain the desired output. Other forms of normalization may be included through the use of similar circuits. Essentially, the circuit described by reference character 438 is illustrated as one form of arithmetic operation which may be employed by the arithmetic operations unit illustrated by refernece character 438 in FIG. 17.

The isolation unit 436 is provided with two sets of contact closures 472 and 470 for respectively connecting and disconnecting the input from the floating amplifier 432 and the output to the sample and hold unit 362. The contact closures are controlled by a clock timer assembly provided in the control logic 440. With contact closures 472 closed and 470 opened, capacitor 474 charges to the value of the output of the floating amplifier. After an appropriate delay time, enabling the capacitor 474 to charge, the control logic signals relays 472 open and closes relays 470 to communicate the capacitor voltage to the sample and hold unit 362. This sequence is continually repeated to the appropriate sample and hold module 362 as each thermocouple is addressed by the multiplexing relay system illustrated by block 430 in FIG. 17. Thus, unit 436 isolates the floating circuitry provided in unit 432 from the grounded circuitry provided at the output of the contact closures 470.

The operation of the averaging circuit illustrated by reference character 438 is well known in the art. The average output is inputted to the positive terminal of operational amplifier 478 which provides the normalized signal to the appropriate sample and hold unit 362.

Figure 20:
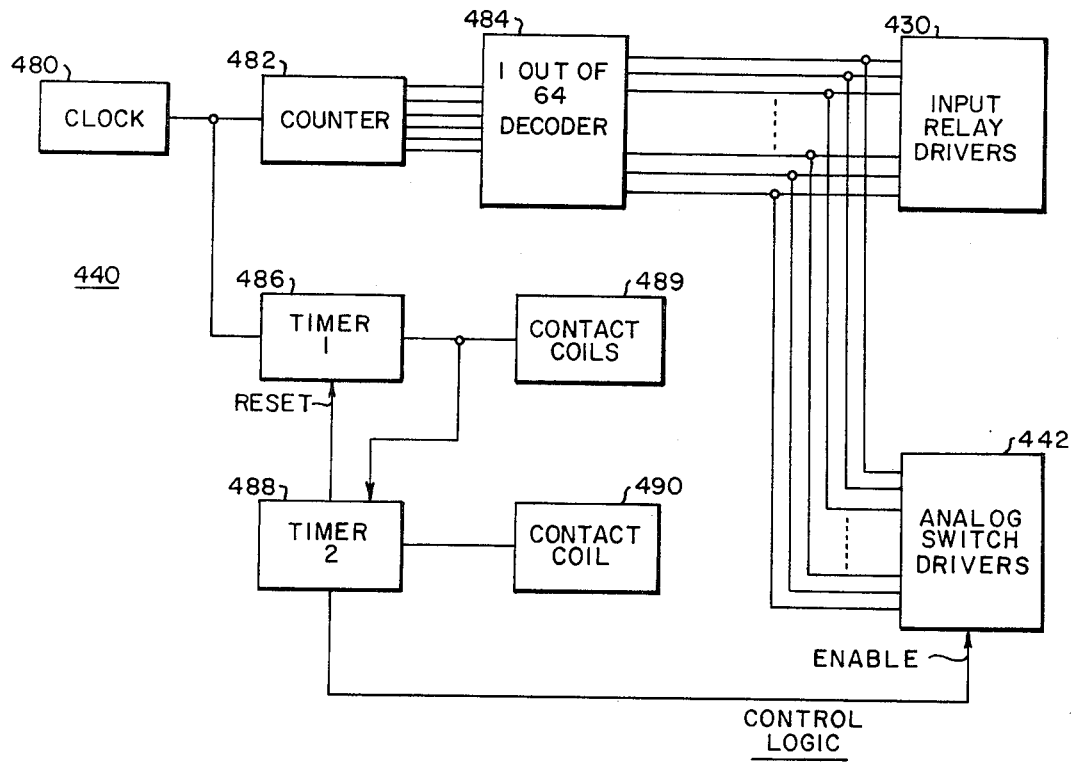
FIG. 20 is a schematic diagram of an exemplary embodiment of the control logic employed in the circuit of FIG. 17.

The control logic for sequencing the aforementioned operation is illustrated schematically in FIG. 20. Clock 480 supplies the clock input to counter 482 which sequentially energizes the sixty four output terminals of the one-out-of-64 decoder 484. As the outputs of the decoder 484 sequentially become active, they activate the corresponding relay contacts for connecting the respective thermocouples to the floating amplifier input. Similarly, the outputs of the decoder 484 sequentially connect the corresponding sample and hold modules to the output of the arithmetic unit 438. The clock 480 additionally supplies inputs to timers 486 and 488 which periodically provide the activation signals to the contact closure coils 489 and 490 associated with contacts 472 and 470, respectively. When timer 486 provides a pulse output to activate the contact closures 472 it also provides an actuation signal to timer 488. The output pulse duration of timer 486 is of sufficient duration to enable the capacitor 474 to charge to the voltage level of the floating amplifier output 476. At the conclusion of the output pulse provided by timer 486, timer 488 supplies an output pulse which activates contact closures 470 communicating the capacitor voltage to the operational amplifier 478. At the conclusion of the output of timer 488, a reset signal is supplied to timer 486, which enables the cycle to be continuously repeated as the thermocouples are sequentially addressed by the input relays 430.

Thus, an alternate interface has been described for directly coupling the in-core thermocouples of a nuclear reactor to the intensity modulated visual monitor of this invention.

Accordingly, the preferred embodiment of this invention, provides a real time pictorial presentation of the core temperature distribution enabling the plant operator to assimilate the entire temperature profile in the time it would normally taken him to read the temperature of one core location. The circuitry described provides an additional feature for indicating when a particular thermocouple voltage exceeds an upper or lower preset limit, linking the corresponding area of the display to provide a strong visual alarm. Furthermore, the visual displays employed have the versatility of providing remote and/or multiple monitors. Readouts of other parameters (rod position, water flow, etc.) may be displayed in a similar fashion, either on an individual basis or alternately by channel selection on the display readout.

Additionally, while the preferred embodiment has illustrated an application to a nuclear reaction environment, it should be understood that the display circuitry of this invention may be employed in other applications utilizing sensors to monitor a particular condition over a defined area.

We claim as our invention:

1. A sensor monitoring system for displaying a profile of the parameter monitored over a defined area divided into a plurality of zones, comprising:
a plurality of sensors positioned to monitor at least a portion of the zones within the defined area, each of said sensors having a corresponding output representative of the value of the parameter monitored within the respective zones;
means for interpolating the outputs of said sensors to provide an output representative of the interpolated value of the monitored parameter in each of the corresponding zones within the defined area; and
means for displaying the respective interpolated values of the monitored parameter according to each of the corresponding zones so as to present the parameter profile over the defined area.

2. The display system of claim 1 wherein the defined area comprises the core of a nuclear reactor and the zones correspond to the respective fuel assembly locations within the core and the sensors are arranged to monitor at least a portion of the total number of fuel assemblies within the core.

3. The display system of claim 1 wherein said sensors monitor, respectively, fewer than said plurality of zones and said interpolating means provides an output to said display means representative of the interpolated value of the monitored parameter within each of the respective zones.

4. The display system of claim 1 including means for interfacing said sensor outputs to said interpolating means so as to amplify and buffer said sensor outputs to obtain a signal of sufficient definition for interpolation.

5. The display system of claim 4 wherein said sensor interface includes:
means for sequentially addressing and reading out the output from each of said plurality of sensors; and
means for storing said sensor outputs in corresponding storage locations and simultaneously presenting the respective outputs from said address means storage locations to the corresponding inputs of said interpolation means.

6. The display system of claim 5 wherein said address means includes contact relay means for sequentially connecting and communicating the outputs from each of said plurality of sensors to the respective storage locations within said address means.

7. The display system of claim 5 including means for arithmetically normalizing the outputs from said sensors to a reference value.

8. The display system of claim 5 wherein said storage means comprise:
a plurality of sample and hold modules equal to at least the number of sensors positioned to monitor the defined area, said modules having inputs from said address means and corresponding outputs to said interpolation means, said address means sequentially activating said modules to communicate the corresponding thermcouple readings to the respective modules for storage and said modules providing simultaneous outputs to the corresponding inputs of said interpolation means.

9. The display system of claim 1 wherein said display means includes:
a visual map designed to correspond to the defined area with subdivisions corresponding to the respective zones, said subdivisions being light intensity modulated according to the respective value of the parameter monitored within the corresponding zones presenting a relative light intensity profile of the monitored parameter over the defined area.

10. The display system of claim 9 including means for indicating a sensor output which is outside the limits of a preselected range.

11. The display system of claim 10 wherein said indicating means flashes a light within at least a portion of the subdivision corresponding to the respective zone associated with the sensor providing the out of limits reading.

12. The display system of claim 9 wherein said visual map is formed on an electroluminescent display comprising an electroluminescent lamp correspondingly subdivided according to the respective zones within the defined area.

13. The display system of claim 9 including means for indicating a sensor failure.

14. The display system of claim 9 wherein said visual map is formed on a TV monitor display.

15. The display system of claim 14 wherein said TV monitor display comprises:
   a display interface for selectively communicating said interpolating means outputs to the input of said TV monitor;
   scan generator means for providing the control signals required by said TV monitor and said display interface including;
   vertical and horizontal blanking signals to form the outline of said visual map;
   selection signals for said display interface to identify the corresponding interpolation means output signal to be communicated to the visual map subdivision being scanned by the TV monitor; and
   a synchronization signal to synchronize said TV monitor to said scan generator so as trace sweeps across the subdivisions on the TV screen, the brightness is modulated according to the profile of the monitored parameter; and
   a video signal processor for interfacing the output signals from said scan generator and said display interface to said TV monitor so as to process said scan generator and display interface outputs into compatible inputs for said TV monitor.

16. The display system of claim 1 wherein said interpolation means comprises a resistive bridge constructed in the form of a matrix corresponding to the shape of the zoned defined area and wherein substantially matched resistors are positioned on the outline of each of the respective zones corresponding to the zones within the defined area, the common resistor terminals forming the nodes of the matrix.

17. The display system of claim 16 wherein the respective sensor outputs are connected to the corresponding nodes of the resistor matrix in the same geometric configuration as the sensors are positioned within the defined area and the respective outputs of the matrix are taken at each of the respective matrix nodes to provide the interpolation means output.

18. The display system of claim 17 wherein each one of the nodes of said matrix having an input representative of a corresponding sensor output is insulated from all other adjacent nodes of said matrix having an input representative of a corresponding sensor output.

19. The display system of claim 1 wherein said interpolation means comprises a resistive plate formed substantially in the shape of the defined area having respective inputs representative of said sensor outputs geometrically arranged to correspond to said sensor location within the defined area and respective outputs geometrically arranged to correspond to the respective zone locations within the defined area.

20. The display system of claim 1 wherein the plurality of sensors are respectively responsive to the temperature values of a corresponding plurality of zones to provide respective outputs respresentative thereof.

21. The display system of claim 20 wherein said sensors comprise thermocouples.

* * * * *